United States Patent
Lee et al.

(10) Patent No.: US 10,425,215 B2
(45) Date of Patent: Sep. 24, 2019

(54) METHOD AND DEVICE FOR SELF-INTERFERENCE CANCELLATION IN FULL-DUPLEX COMMUNICATION SYSTEM

(71) Applicant: Samsung Electronics Co., Ltd., Suwon-si, Gyeonggi-do (KR)

(72) Inventors: Byung-Hwan Lee, Yongin-si (KR); Jong-Bu Lim, Yongin-si (KR); Ji-Yun Seol, Seongnam-si (KR); Chae-Hee Lim, Suwon-si (KR); Su-Ryong Jeong, Yongin-si (KR); Sung-Nam Hong, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/742,699

(22) PCT Filed: Jun. 30, 2016

(86) PCT No.: PCT/KR2016/007015
§ 371 (c)(1),
(2) Date: Jan. 8, 2018

(87) PCT Pub. No.: WO2017/007172
PCT Pub. Date: Jan. 12, 2017

(65) Prior Publication Data
US 2018/0205533 A1    Jul. 19, 2018

(30) Foreign Application Priority Data
Jul. 8, 2015 (KR) .................. 10-2015-0097069

(51) Int. Cl.
*H04L 5/14* (2006.01)
*H04B 15/02* (2006.01)
(Continued)

(52) U.S. Cl.
CPC .......... *H04L 5/1461* (2013.01); *H04B 1/525* (2013.01); *H04B 7/063* (2013.01); *H04B 7/0695* (2013.01);
(Continued)

(58) Field of Classification Search
CPC ... H04W 72/005; H04W 16/14; H04W 12/04; H04B 7/0452; H04B 7/0408;
(Continued)

(56) References Cited

U.S. PATENT DOCUMENTS

2004/0157646 A1* 8/2004 Raleigh ............... H01Q 3/2605
455/562.1
2006/0121946 A1* 6/2006 Walton ................. H04B 7/0417
455/561
(Continued)

FOREIGN PATENT DOCUMENTS

KR   10-2009-0023879 A    3/2009
KR   10-2016-0113869 A    10/2016
(Continued)

*Primary Examiner* — Jung Liu
(74) *Attorney, Agent, or Firm* — Jefferson IP Law, LLP

(57) ABSTRACT

Disclosed is a 5G or pre-5G communication system to be provided for supporting a data transmission rate higher than that of a 4G communication system such as LTE. A method for cancelling self-interference in a full-duplex communication system is provided. The method comprises the steps of: cancelling cancellable self-interference components through an analog interference cancellation circuit, and estimating a channel state of an uplink channel and a channel state of a downlink channel on the basis of remaining residual self-interference components; estimating a channel capacity for each of possible beam combinations on the basis of the estimated uplink channel state and downlink channel state; selecting the beam combination having the largest channel capacity from among the possible beam
(Continued)

combinations; and cancelling self-interference from a received signal on the basis of the selected beam combination.

20 Claims, 14 Drawing Sheets

(51) Int. Cl.
*H04B 7/06* (2006.01)
*H04B 7/08* (2006.01)
*H04L 5/00* (2006.01)
*H04B 1/525* (2015.01)
*H04B 7/0413* (2017.01)
*H04J 11/00* (2006.01)
*H04W 72/04* (2009.01)

(52) U.S. Cl.
CPC ............. *H04B 7/088* (2013.01); *H04B 15/02* (2013.01); *H04L 5/0023* (2013.01); *H04B 7/0413* (2013.01); *H04J 11/0036* (2013.01); *H04L 5/006* (2013.01); *H04L 5/0035* (2013.01); *H04W 72/046* (2013.01)

(58) Field of Classification Search
CPC .. H04B 7/0617; H04B 7/0626; H04B 7/0413; H04B 7/0478; H04B 7/0669; H04B 7/0417; H04B 7/10; H04B 1/123; H04B 1/525; H04L 5/14; H04L 1/1825; H04L 1/1896; H04L 1/18; H04L 2001/0097
See application file for complete search history.

(56) References Cited

U.S. PATENT DOCUMENTS

| | | | |
|---|---|---|---|
| 2008/0144733 A1* | 6/2008 | ElGamal | H04L 1/0003 375/267 |
| 2009/0296663 A1* | 12/2009 | Wild | H01Q 1/246 370/335 |
| 2013/0102254 A1* | 4/2013 | Cyzs | H04B 1/126 455/63.1 |
| 2013/0301487 A1* | 11/2013 | Khandani | H04W 16/14 370/278 |
| 2014/0161018 A1* | 6/2014 | Chang | H04B 7/0452 370/312 |
| 2015/0280887 A1* | 10/2015 | Ko | H04B 1/525 370/330 |
| 2016/0241322 A1* | 8/2016 | Son | H04B 7/0617 |
| 2018/0006690 A1* | 1/2018 | Shepard | H04B 7/0452 |

FOREIGN PATENT DOCUMENTS

| | | |
|---|---|---|
| WO | 2014/092365 A1 | 6/2014 |
| WO | 2015/046895 A1 | 4/2015 |
| WO | 2015/096027 A1 | 7/2015 |

* cited by examiner

METHOD AND DEVICE FOR SELF-INTERFERENCE CANCELLATION IN FULL-DUPLEX COMMUNICATION SYSTEM

CROSS-REFERENCE TO RELATED APPLICATION(S)

This application is a U.S. National Stage application under 35 U.S.C. § 371 of an International application filed on Jun. 30, 2016 and assigned application number PCT/KR2016/007015, which claimed the benefit of a Korean patent application filed on Jul. 8, 2015 in the Korean Intellectual Property Office and assigned Serial number 10-2015-0097069, the entire disclosure of which is hereby incorporated by reference.

TECHNICAL FIELD

The present disclosure relates to a method and apparatus for cancelling self-interference in a full-duplex communication system using a full-duplex communication scheme.

BACKGROUND ART

To satisfy demands for wireless data traffic having increased since commercialization of $4^{th}$-Generation (4G) communication systems, efforts have been made to develop improved 5th-Generation (5G) communication systems or pre-5G communication systems. For this reason, the 5G communication system or the pre-5G communication system is also called a beyond-4G-network communication system or a post-long-term evolution (LTE) system.

To achieve a high data rate, implementation of the 5G communication system in an ultra-high frequency (mm-Wave) band (e.g., a 60 GHz band) is under consideration. In the 5G communication system, beamforming, massive multi-input multi-output (MIMO), full dimensional MIMO (FD-MIMO), an array antenna, analog beamforming, and large-scale antenna technologies have been discussed to alleviate a propagation path loss and to increase a propagation distance in the ultra-high frequency band.

For system network improvement, in the 5G communication system, techniques such as an evolved small cell, an advanced small cell, a cloud radio access network (RAN), an ultra-dense network, a device to device (D2D) communication, a wireless backhaul, a moving network, cooperative communication, coordinated multi-points (CoMPs), and interference cancellation have been developed.

In the 5G system, advanced coding modulation (ACM) schemes including hybrid frequency-shift keying (FSK) and quadrature amplitude modulation (QAM) modulation (FQAM) and sliding window superposition coding (SWSC), and advanced access schemes including filter bank multi carrier (FBMC), non-orthogonal multiple access (NOMA), and sparse code multiple access (SCMA) have been developed.

Meanwhile, a full-duplex communication system using a full-duplex communication scheme is an innovative system capable of doubling a channel capacity by simultaneously performing transmission and reception using the same frequency resource. The full-duplex communication system may not be able to avoid self-interference (SI) caused by a transmitted signal received back due to bidirectional communication, and research has been continuously carried out to solve a problem occurring due to SI.

A scheme which has recently attracted the most attention cancels an influence of SI in terms of a circuit, and the SI cancellation scheme is divided into a digital cancellation scheme using digital signal processing and an analog cancellation scheme using an analog interference cancellation circuit depending on whether a magnitude of an SI signal causing SI is within or out of a dynamic range in which the SI signal may be received in a digital manner. Typically, to cancel SI at a system level, the digital interference cancellation scheme and the analog interference cancellation scheme may be generally used at the same time.

The digital interference cancellation scheme detects channel characteristics, by using a signal branched from a digital transmission signal and a digital reception signal, from a difference between the transmission signal and the reception signal, and applies the detected channel characteristics to the digital reception signal to cancel the SI signal.

The analog interference cancellation scheme cancels the SI signal from a received signal by applying a circuit having gain adjustment, phase adjustment, and a fixed delay time to a transmission signal branched from an analog transmission circuit, based on an assumption that a received SI signal is a finite number of signals received after an already known fixed time delay. The gain and the phase to be adjusted by the circuit are obtained from estimated interference characteristics.

However, the performance limitation of the analog interference cancellation scheme and the digital interference cancellation scheme is determined by hardware configurations, and for high output power, desired SI cancellation performance may not be satisfied merely by the analog interference cancellation scheme and the digital interference cancellation scheme. To overcome such limitations, a scheme for separating a transmission antenna and a reception antenna or a scheme for using polarization characteristics of the transmission and reception antennas has been considered. However, the scheme for separating the transmission antenna and the reception antenna may increase the size of an apparatus in which the antennas are mounted or complicate installation of the antennas, and the scheme for using the polarization characteristics of the transmission and reception antennas may not effectively cancel the SI signal caused by reflection.

Therefore, a need exists for a scheme for cancelling the SI signal in a full-duplex communication system, other than the scheme for separating the transmission antenna and the reception antenna or the scheme for using polarization characteristics of the transmission and reception antennas.

The above data is presented as background data only to assist with an understanding of the present disclosure. No determination has been made, and no assertion is made, as to whether any of the above might be applicable as prior art with regard to the present disclosure.

DETAILED DESCRIPTION OF THE INVENTION

Technical Problem

An embodiment of the present disclosure provides a method and apparatus for cancelling SI in a full-duplex communication system.

An embodiment of the present disclosure provides a method and apparatus for selecting an optimal beam to cancel SI in a full-duplex communication system.

Technical Solution

A method for cancelling SI in a full-duplex communication system according to an embodiment of the present disclosure includes estimating a channel state of an uplink (UL) channel and a channel state of a downlink (DL) channel based on a residual SI component remaining after cancellation of an SI component cancellable by an analog interference cancellation circuit, estimating a channel capacity for each of possible beam combinations based on the estimated channel state of the UL channel and the estimated channel state of the DL channel, selecting a beam combination corresponding to the greatest channel capacity from among the possible beam combinations, and cancelling SI from a received signal based on the selected beam combination.

A communication apparatus which is communicable in a full-duplex communication system according to an embodiment of the present disclosure includes a transceiver and a controller connected to the transceiver, in which the controller is configured to estimate a channel state of an uplink (UL) channel and a channel state of a downlink (DL) channel based on a residual SI component remaining after cancellation of an SI component cancellable by an analog interference cancellation circuit, and to estimate a channel capacity for each of possible beam combinations based on the estimated channel state of the UL channel and the estimated channel state of the DL channel, select a beam combination corresponding to the greatest channel capacity from among the possible beam combinations, and cancel SI from a received signal based on the selected beam combination.

Other aspects, advantages, and key features of the present disclosure will be processed together with the attached drawings, and will be apparent to those of ordinary skill in the art from the following detailed description disclosing various embodiments of the present disclosure.

Before undertaking the DETAILED DESCRIPTION OF THE INVENTION below, it may be advantageous to set forth definitions of certain words and phrases used throughout this patent document: The terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system or part thereof that controls at least one operation, and such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

Advantageous Effects

An embodiment of the present disclosure enables cancellation of SI in a full-duplex communication system.

An embodiment of the present disclosure makes it possible to select an optimal beam for cancelling SI in a full-duplex communication system.

BRIEF DESCRIPTION OF DRAWINGS

The above and other aspects, features and advantages of certain exemplary embodiments of the present disclosure will be more apparent from the following description taken in conjunction with the accompanying drawings, in which.

MODE FOR CARRYING OUT THE INVENTION

Figure 1:
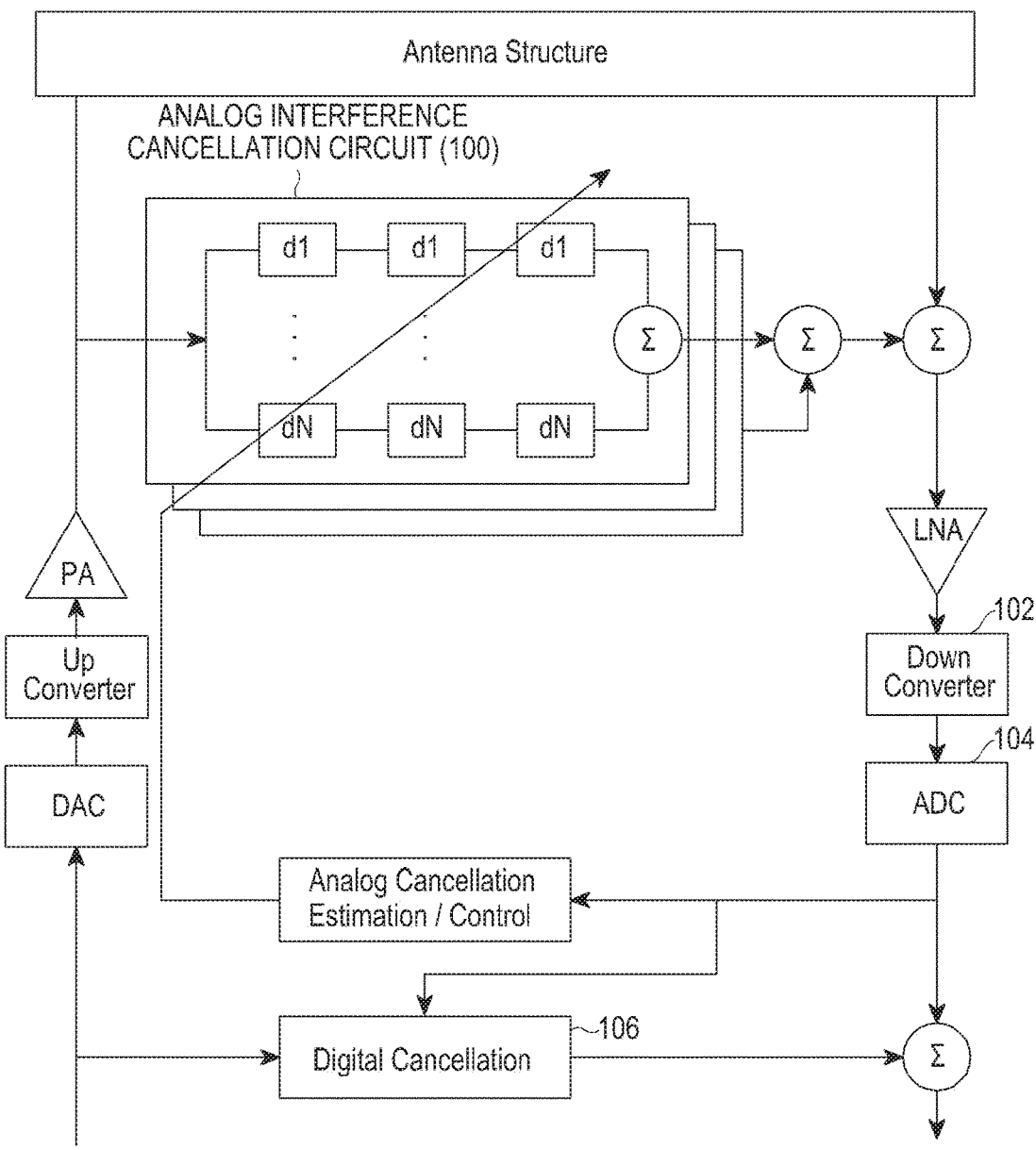
FIG. 1 illustrates a structure of an analog interference cancellation circuit in a full-duplex communication system according to an embodiment of the present disclosure.

Hereinafter, embodiments of the present disclosure will be described in detail with reference to the accompanying drawings. In the following description, only parts necessary for understanding of operations according to embodiments of the present disclosure will be described and other parts will not be described not to obscure the subject matter of the present disclosure. Further, the terminologies to be described below are defined in consideration of functions in the embodiments of the present disclosure and may vary depending on a user's or operator's intention or practice. Therefore, the definitions should be made based on the contents throughout the entire description of the present disclosure.

Various changes may be made to the present disclosure and the present disclosure may have various embodiments which will be described in detail with reference to the drawings. However, the embodiments according to the concept of the present disclosure are not construed as limited to specified disclosures, and include all changes, equivalents, or substitutes that do not depart from the spirit and technical scope of the present disclosure.

It is to be understood that the singular forms "a," "an," and "the" include plural referents unless the context clearly dictates otherwise. Thus, for example, a component surface includes one or more component surfaces.

Although the terms such as "first" and "second" used in the various exemplary embodiments of the present disclosure may modify various elements of the various exemplary embodiments, these terms do not limit the corresponding elements. These terms may be used for the purpose of distinguishing one element from another element. For example, a first element may be named as a second element without departing from the right scope of the various exemplary embodiments of the present disclosure, and similarly, a second element may be named as a first element. The term "and/or" includes a combination of a plurality of related provided items or any one of the plurality of related provided items.

The terms used in the various exemplary embodiments of the present disclosure are for the purpose of describing particular exemplary embodiments only and are not intended to be limiting. The singular forms are intended to include the plural forms as well, unless the context clearly indicates otherwise. The term "include" or "has" used in the exemplary embodiments of the present disclosure is to indicate the presence of features, numbers, steps, operations, elements, parts, or a combination thereof described in the specifications, and does not preclude the presence or addition of one or more other features, numbers, steps, operations, elements, parts, or a combination thereof.

All of the terms used herein including technical or scientific terms have the same meanings as those generally understood by an ordinary skilled person in the related art unless they are defined other. The terms defined in a generally used dictionary should be interpreted as having the same meanings as the contextual meanings of the relevant technology and should not be interpreted as having ideal or exaggerated meanings unless they are clearly defined in the various exemplary embodiments.

An electronic device according to various embodiments of the present disclosure may be a device including a communication function. For example, an electronic device may include a smartphone, a tablet personal computer (PC), a mobile phone, a video phone, an electronic-book (e-book) reader, a desktop PC, a laptop PC, a netbook computer, a workstation, a server, a personal digital assistant (PDA), a portable multimedia player (PMP), an MP3 player, a mobile medical equipment, a camera, and a wearable device (e.g., a head-mounted device (HMD), electronic clothing, an electronic bracelet, an electronic necklace, an electronic appcessory, an electronic tattoo, or a smart watch.

According to various embodiments of the present disclosure, the electronic device may be a smart home appliance having a communication function. For example, the smart home appliance may include a TV, a digital video disk (DVD) player, audio equipment, a refrigerator, an air conditioner, a vacuum cleaner, an oven, a microwave oven, a washer, a drier, an air cleaner, a set-top box, a TV box (e.g., HomeSync™ of Samsung, TV™ of Apple, or TV™ of Google), a game console, an electronic dictionary, a camcorder, and an electronic frame.

According to various embodiments of the present disclosure, the electronic device may include medical equipment (e.g., a magnetic resonance angiography (MRA) device, a magnetic resonance imaging (MRI) device, a computed tomography (CT) device, an imaging device, or an ultrasonic device), a navigation system, a global positioning system (GPS) receiver, an event data recorder (EDR), a flight data recorder (FDR), a vehicle infotainment device, electronic equipment for ships (e.g., a navigation system, gyroscope, and gyro compass for ships), avionics, a security device, an industrial or home robot, and so forth.

According to some embodiments, the electronic device may include a part of a furniture or building/structure having a communication function, an electronic board, an electronic signature receiving device, a projector, and various measuring instruments (for example, a water, electricity, gas, or electric wave measuring device).

The electronic device according to various embodiments of the present disclosure may be one of the above-listed devices or a combination thereof. It will be obvious to those of ordinary skill in the art that the electronic device according to various embodiments of the present disclosure is not limited to the above-listed devices.

A method and apparatus proposed in an embodiment of the present disclosure are applicable to various communication systems such as an Institute of Electrical and Electronics Engineers (IEEE) 802.11 communication system, an IEEE 802.16 communication system, a digital multimedia broadcasting (DMB) service, a digital video broadcasting-handheld (DVB-H) service, and a mobile broadcasting service such as an Advanced Television Systems Committee-Mobile/Handheld (ATSC-M/H) service, a digital video broadcasting system such as an Internet protocol television (IPTV) service, an Moving Picture Experts Group (MPEG) media transport (MMT) system, an evolved packet system (EPS), an Long Term Evolution (LTE) communication system, an LTE-Advanced (LTE-A) communication system, a high-speed downlink packet access (HSDPA) mobile communication system, a high-speed uplink packet access (HSDPA) mobile communication system, a 3rd-Generation (3G) Project Partnership 2 (3GPP2) high rate packet data (HRPD) mobile communication system, a 3GPP2 wideband code division multiple access (WCDMA) mobile communication system, a 3GPP2 code division multiple access (CDMA) mobile communication system, a mobile Internet protocol (IP), and so forth.

A description of an embodiment of the present disclosure will be made assuming a full-duplex communication system. It is also assumed that the full-duplex communication system may include an evolved NodeB (eNB) and a user equipment (UE), and the eNB may perform transmission and reception at the same time by using the same frequency resource, but the UE may not be able to perform transmission and reception at the same time by using the same frequency resource due to a hardware configuration constraint. A self-interference (SI) signal generated by bidirectional communication using the same frequency resource is assumed to be cancelled using digital interference cancellation as long as the SI signal falls within an input range of an analog-to-digital converter (ADC).

FIG. 1 illustrates a structure of an analog interference cancellation circuit in a full-duplex communication system according to an embodiment of the present disclosure.

Referring to FIG. 1, an analog interference cancellation circuit 100 illustrated in FIG. 1 is implemented in the form of a circuit having a plurality of taps to simulate an SI channel and to cancel a transmission signal passing through the SI channel from a reception signal. In the analog interference cancellation circuit 100, d indicates a delay time of a particular tap of the SI channel, a indicates a gain of the particular tap of the SI channel, b indicates a phase of the particular tap of the SI channel, and one tap of the SI channel may be configured by a combination of a delay time, a gain, and a phase.

The SI channel, which is a linear channel, includes one or more taps, and the SI channel $h_{SI}(t,\tau)$ may be expressed as shown in Equation 1.

$$h_{SI}(t,\tau) = \sum_{i=0}^{M(i)} \alpha_i(t)\beta_i(t)\delta(\tau - \tau_i(t))$$ [Equation 1]

In Equation 1, $\delta(t)$ indicates a dirac delta function, $\alpha(t)$ indicates a multi-path tap gain, $\beta(t)$ indicates a multi-path tap phase, and $\tau(t)$ indicates a multi-path tap delay time.

In the analog interference cancellation circuit 100, interference cancellation may be expressed as shown in Equation 2.

$$s(t) \otimes h_{SI}(t,\tau) - s(t) \otimes \hat{h}_{SI}(t,\tau) \approx 0$$ [Equation 2]

That is, by subtracting a transmission signal s(t) passing through a simulated SI channel $\hat{h}_{SI}(t,\tau)$ from the transmission signal s(t) passing through the SI channel $h_{SI}(t,\tau)$, the SI signal originating from the SI channel is cancellable from the reception signal.

The analog interference cancellation circuit 100 is a limited circuit having a finite delay time, and due to such analog SI cancellation capability limitations, residual SI is inevitably left even if interference is cancelled by the analog interference cancellation circuit 100. Before the residual SI is described, an eNB reception signal R may be expressed as shown in Equation 3.

$$R = H(S_{RF} + N_{Tx}) + SI + N_{Rx}$$ [Equation 3]

In Equation 3, R indicates a reception signal, H indicates a channel of the reception signal, $S_{RF}$ indicates a transmission radio frequency (RF) signal, $N_{Tx}$ indicates a transmission noise, SI indicates an SI component, and $N_{Rx}$ indicates a reception noise.

The reception signal R of the eNB includes an SI signal and a reception noise simultaneously received due to bidirectional communication, as well as a transmission signal and a noise signal transmitted from a UE. The eNB reception signal R may also include residual SI due to the analog SI cancellation capability limitations, and an eNB reception signal $R_{ASIC}$ may be expressed as shown in Equation 4.

$$R_{ASIC} = H(S_{RF} + N_{Tx}) + (SI - SI_{AC}) + N_{Rx}$$ [Equation 4]

$$= H(S_{RF} + N_{Tx}) + SI_{residual} + N_{Rx}$$

In Equation 4, $R_{ASIC}$ indicates a reception signal after analog interference cancellation, H indicates a channel of the reception signal, $S_{RF}$ indicates a transmission RF signal, $N_{Tx}$ indicates a transmission noise, SI indicates an SI component, $N_{Rx}$ indicates a reception noise, $SI_{AC}$ indicates an SI component that is cancellable by the analog interference cancellation circuit 100, and $SI_{residual}$ indicates a residual SI component remaining after cancellation of the SI component that is cancellable by the analog interference cancellation circuit 100.

Meanwhile, the reception signal on which analog interference cancellation is performed by the analog interference cancellation circuit 100 is converted into a baseband signal through a down-converter 102 and is sampled and converted into a digital signal by an ADC 104. In this process, a gain of the reception signal may be adjusted to prevent saturation of the reception signal, and the gain to be adjusted may be determined proportionally to a digital dynamic range added by an ADC part and a related circuit. A magnitude of the reception signal is determined by a transmission signal and a transmission noise of a UE and a residual SI signal and a reception noise of an eNB, and if the transmission signal and the transmission noise of the UE are greater than or equal to the residual SI signal of the eNB, the residual SI signal is cancellable by digital interference cancellation without degradation of the transmission signal.

Thus, in an embodiment of the present disclosure, it is assumed that the residual SI signal of the eNB is greater than the transmission signal and the transmission noise of the UE, and a corresponding reception signal $R_{BB}$ may be expressed as shown in Equation 5.

$$R_{BB} = \frac{|DR_{ADC}|}{|H(S_{BB} + N_{Tx}) + SI_{residual}|}$$ [Equation 5]

$$(H(S_{BB} + N_{Tx}) + SI_{residual\_BB}) + N_{Rx}$$

$$\approx \frac{|DR_{ADC}|}{|SI_{residual}|}(H(S_{BB} + N_{Tx}) + SI_{residual\_BB}) + N_{Rx}$$

where $(H(S_{BB} + N_{Tx})) \ll SI_{residual\_BB}$

In equation 5, $R_{BB}$ indicates a digital signal sampled after a reception signal is down-converted after analog interference cancellation, that is, a signal output from the ADC 104, $DR_{ADC}$ indicates an ADC dynamic range on the analog interference cancellation circuit 100, H indicates a channel of the reception signal, $S_{BB}$ indicates a transmission baseband signal, $N_{Tx}$ indicates a transmission noise, $N_{Rx}$ indicates a reception noise, $SI_{residual}$ indicates a residual SI component remaining after cancellation of an SI component that is cancellable by the analog interference cancellation circuit 100, and $SI_{residual\_BB}$ indicates a baseband residual SI component remaining after cancellation of the SI component that is cancellable by the analog interference cancellation circuit 100.

A final reception signal $R_{DSIC}$ obtained by sampling a baseband signal with the ADC 104 and performing digital interference cancellation with a digital interference canceller 106 may be expressed as shown in Equation 6.

$$R_{DSIC} = \frac{|DR_{ADC}|}{|SI_{residual}|}(H(S_{BB} + N_{Tx}) + SI_{residual\_BB}) +$$ [Equation 6]

$$N_{Rx} - \frac{|DR_{ADC}|}{|SI_{residual}|}SI_{residual\_BB}$$

$$= \frac{|DR_{ADC}|}{|SI_{residual}|}(H(S_{BB} + N_{Tx})) + N_{Rx}$$

In equation 6, $R_{DSIC}$ indicates a final signal after analog interference cancellation and digital interference cancellation, that is, a signal output from the digital interference canceller 106, $DR_{ADC}$ indicates an ADC dynamic range on the analog interference cancellation circuit 100, H indicates a channel of the reception signal, $S_{BB}$ indicates a transmission baseband signal, $N_{Tx}$ indicates a transmission noise, $N_{Rx}$ indicates a reception noise, $SI_{residual}$ indicates a residual SI component remaining after cancellation of an SI component that is cancellable by the analog interference cancellation circuit 100, and $SI_{residual}$ BB indicates a baseband residual SI component remaining after cancellation of the SI component that is cancellable by the analog interference cancellation circuit 100.

After channel estimation and equalization are performed on the final reception signal $R_{DSIC}$, a signal to interference plus noise ratio (SINR) may be expressed as shown in Equation 7.

$$SINR = \frac{\frac{|DR_{ADC}|}{|SI_{residual}|}S_{BB}}{\frac{|DR_{ADC}|}{|SI_{residual}|}N_{Tx} + N_{Rx}} \quad \text{[Equation 7]}$$

$$= \frac{S_{BB}}{N_{Tx} + \frac{|SI_{residual}|}{|DR_{ADC}|}N_{Rx}}$$

In Equation 7, $DR_{ADC}$ indicates an ADC dynamic range on the analog interference cancellation circuit 100, $S_{BB}$ indicates a transmission baseband signal, $N_{Tx}$ indicates a transmission noise, $N_{Rx}$ indicates a reception noise, and $SI_{residual}$ indicates a residual SI component remaining after cancellation of an SI component that is cancellable by the analog interference cancellation circuit 100.

According to Equation 7, since the SINR is degraded as much as the magnitude of the residual SI component $SI_{residual}$ greater than the ADC dynamic range $DR_{ADC}$ on the analog interference cancellation circuit 100, the amount of residual SI, rather than the SINR, needs to be metrics of beamforming.

Meanwhile, the SI cancellation capability limitations of the analog interference cancellation circuit 100, that is, the SI cancellation capability limitations may be expressed as shown in Equation 8.

$$h_{SI}^{C}(\tau) = \sum_{j=0}^{N-1} \alpha'_j \beta'_j \delta(\tau - \tau'_j) \quad \text{[Equation 8]}$$

In Equation 8, $\delta(t)$ indicates a dirac delta function, N indicates the number of successive interference cancellation (SIC) tap delays, $\alpha'$ indicates an analog SIC tap gain, $\beta'$ indicates an analog SIC tap phase, and $\tau'$ indicates an analog SIC tap delay time.

A residual SI signal $r_{residual\_SI}(t)$ obtained from the SI channel and the analog SI cancellation capability limitations may be expressed as shown in Equation 9.

$$r_{residual\_SI}(t) = \sum_{i=0}^{M(t)} \alpha_i(t)\beta_i(t)s(t - \tau_i(t)) - \sum_{i=0}^{N-1} \alpha'_i \beta'_i s(t - \tau'_i) \quad \text{[Equation 9]}$$

In Equation 9, s(t) indicates a transmission signal and $r_{residual\_SI}(t)$ indicates a residual SI signal.

In view of maximal utilization of the analog SI cancellation capability, the residual SI signal $r_{residual\_SI}(t)$ may be regarded as a signal component corresponding to a tap related to an SI signal having a long delay time in the SI channel.

The residual SI component used as the metrics of beamforming may be derived from Equation 9 as shown in Equation 10.

$$SI_{Residual}(t) \approx \sqrt{\sum_{i=N}^{M(t)} |\alpha_i(t)|^2} \quad \text{[Equation 10]}$$

A channel capacity optimized based on the residual SI component used as the metrics of beamforming and full-duplex communication that performs transmission and reception at the same time using the same frequency resource may be expressed as shown in Equation 11.

$$C_{FD} = W(\log(1 + SINR_{DL}) + \log(1 + SINR_{UL})) \quad \text{[Equation 11]}$$

$$= W[\log(1 + SINR_{DL}) +$$

$$\log\left(1 + \left(\frac{S_{UL\_UE}}{N_{UE\_Tx} + \frac{|SI_{residual}|}{|DR_{ADC}|}N_{Rx}}\right)\right)]$$

In Equation 11, $SINR_{DL}$ indicates an SINR of a downlink (DL), $SINR_{UL}$ indicates an SINR of an uplink (UL), $S_{UL\_UE}$ indicates a signal of a UE connected to an UL, $N_{UL\_Tx}$ indicates a transmission noise of a UE connected to an UL, $DR_{ADC}$ indicates an ADC dynamic range on the analog interference cancellation circuit 100, $N_{Rx}$ indicates a reception noise, and $SI_{residual}$ indicates a remaining SI component remaining after an SI component that is cancellable by the analog interference cancellation circuit 100 is cancelled.

In Equation 11, to optimize the capacity of the full-duplex communication system, a channel capacity is estimated based on an SINR of each of a reception signal (or a DL signal) of the UE and a reception signal (or an UL signal) of the eNB. In this case, the metrics of the SINR include residual SI to reflect the analog SI cancellation capability limitations. Thus, the system performance may be maximized by selecting a beam that maximizes the channel capacity from among beams between the eNB and the UE, based on the channel capacity calculated using Equation 11.

Meanwhile, the channel capacity of the full-duplex communication system may be further improved based on a feature that the full-duplex communication system performs bidirectional communication using the same frequency resource and a feature that a rate of UL traffics and a rate of DL traffics are asymmetric.

Generally, the UL has the less traffic volume than the DL and the SINR of the UL may be lowered by SI, such that reduction of a weight value of the UL in case of the less UL traffics than the DL traffics may have the same effect as reduction of an influence of SI.

An example of applying a weight value to Equation 11 expressing the optimized channel capacity to adjust the channel capacity based on a ratio of a UL traffic volume and a DL traffic volume may be expressed as shown in Equation 12.

$$C_{FD} = W((1 + \alpha)\log(1 + SINR_{DL}) + \qquad \text{[Equation 12]}$$
$$(1 - \alpha)\log(1 + SINR_{UL}))$$
$$= W[(1 + \alpha)\log(1 + SINR_{DL}) +$$
$$(1 - \alpha)\log\left(1 + \left(\frac{S_{UL\_UE}}{N_{UE\_Tx} + \frac{|SI_{residual}|}{|DR_{ADC}|}N_{Rx}}\right)\right)]$$
where $\alpha = -1 \sim +1 \ -1(ULHD), 0(FD),$
$1(DLHD)$ In Equation 12, $SINR_{DL}$ indicates an SINR of a downlink (DL), $SINR_{UL}$ indicates an SINR of an uplink (UL), $S_{UL\_UE}$ indicates a signal of a UE connected to an UL, $N_{UL\_Tx}$ indicates a transmission noise of a UE connected to an UL, $DR_{ADC}$ indicates an ADC dynamic range on the analog interference cancellation circuit 100, $N_{Rx}$ indicates a reception noise, $SI_{residual}$ indicates a remaining SI component remaining after an SI component that is cancellable by the analog interference cancellation circuit 100 is cancelled, and α indicates a weight value for reflecting a ratio of the UL traffic volume and the DL traffic volume.

Thus, the system performance may be maximized by selecting a beam that maximizes the channel capacity from among beams between the eNB and the UE, based on the channel capacity calculated using Equation 12.

Meanwhile, when the DL or the UL supports multi input multi output (MIMO), each stream based on an MIMO rank may have an independent SINR. In this case, the channel capacity may be maximized based on the independent SINR. If the DL or the UL has a plurality of ranks in an MIMO channel, the channel capacity may be expressed as shown in Equation 13.

$$C_{FD} = W\Biggl\{(1 + \alpha)[\log(1 + SINR_{DL\_R1}) + \qquad \text{[Equation 13]}$$
$$\ldots + \log(1 + SINR_{DL\_RM})] +$$
$$(1 - \alpha)\left[\log\left(1 + \left(\frac{S_{UL\_UE\_R1}}{N_{UE\_Tx1} + \frac{|SI_{residual1}|}{|DR_{ADC}|}N_{Rx}}\right)\right) + \right.$$
$$\left.\ldots + \log\left(1 + \left(\frac{S_{UL\_UE\_RN}}{N_{UE\_TxN} + \frac{|SI_{residualN}|}{|DR_{ADC}|}N_{Rx}}\right)\right)\right]\Biggr\}$$

In Equation 13, $SINR_{DL\_R1}$ indicates an SINR of a 1st stream of a DL, $SINR_{DL\_RN}$ indicates an nth stream of the DL, $S_{UL\_UE\_R1}$ indicates a $1^{st}$ stream signal of a UE connected to an UL, $S_{UL\_UE\_RN}$ indicates an $n^{th}$ stream signal of the UE connected to the UL, $N_{UE\_Tx1}$ indicates a transmission noise of the $1^{st}$ stream of the UE connected to the UL, $N_{UE\_TxN}$ indicates a transmission noise of the $n^{th}$ stream of the UE connected to the UL, $DR_{ADC}$ indicates an ADC dynamic range on the analog interference cancellation circuit 100, $N_{Rx}$ indicates a reception noise, $SI_{residual1}$ indicates a $1^{st}$ remaining SI component remaining after an SI component that is cancellable by the analog interference cancellation circuit 100 is cancelled, $SI_{residual1N}$ indicates an $n^{th}$ remaining SI component remaining after the SI component that is cancellable by the analog interference cancellation circuit 100 is cancelled, and α indicates a weight value for reflecting a ratio of the UL traffic volume and the DL traffic volume.

Thus, the system performance may be maximized by selecting a beam that maximizes the channel capacity from among beams between the eNB and the UE, based on the channel capacity calculated using Equation 13.

In an embodiment of the present disclosure, the full-duplex communication system using full-duplex communication has been described as an example. However, due to an influence of SI produced by the management of full-duplex communication, the management of half-duplex communication may be more efficient than the management of full-duplex communication in some cases.

Therefore, an embodiment of the present disclosure also provides a scheme for selecting and using one of full-duplex communication and half-duplex communication based on a total interference magnitude and a channel capacity.

Among metrics used for selection of one of full-duplex communication and half-duplex communication, the total interference magnitude is related to determination of whether the interference signal is within a limit of SI cancellation processible by the system. The limit of SI cancellation processible by the system may vary with a configuration of the system.

For example, if analog SI cancellation performance is 50 dB and digital SI cancellation performance is 50 dB for a received SI signal, SI greater by 100 dB than a receiver's sensitivity to which a noise figure is added may be processible by the system. However, if an SI signal exceeding 100 dB is received, half-duplex communication may be selected and used rather than full-duplex communication.

Among the metrics used for selection of one of full-duplex communication and half-duplex communication, the channel capacity is related to determination of whether the channel capacity estimated in full-duplex communication is greater than a sum of channel capacities based on SINRs of the UL and the DL in half-duplex communication.

For example, if a channel capacity estimated in full-duplex communication is 8.0, a channel capacity based on the SINR of the UL in half-duplex communication is 4.0, and a channel capacity based on the SINR of the DL in half-duplex communication is 5.0, then a sum of the channel capacities of the UL and the DL in half-duplex communication is 9.0, such that half-duplex communication having the greater channel capacity than full-duplex communication may be selected.

Meanwhile, to select a beam based on a channel capacity in the full-duplex communication system, a process of searching for and determining a Tx beam and an Rx beam is needed.

Such a beam management method may include a method in which both an eNB and a UE manage a beam and a method in which an eNB manages a beam. The beam management method by both the eNB and the UE may optimize the system performance, but the beam management method by the eNB may be selected according to constraints of the UE.

A method for searching for a Tx beam/an Rx beam optimized for SI of the full-duplex communication system may include a method for searching for both a Tx beam and an Rx beam and a method for separately searching for a Tx beam and an Rx beam. Although the method for searching for both the Tx beam and the Rx beam may optimize the system performance, the method for separately searching for the Tx beam and the Rx beam may be selected due to other constraints.

A process of selecting the optimal beam proposed in the present disclosure is a process of transmitting and receiving a Tx beam and an Rx beam at the same time in any possible bean directions, estimating SI for possible combinations of the Tx beam/the Rx beam, estimating an SINR and an MIMO rank of each of a UL and a DL, and selecting a beam corresponding to the greatest channel capacity. In an embodiment of the present disclosure to be described below, a process of transmitting a signal once or more times in beam directions possible for transmission of the eNB and receiving the signal in beam directions possible for reception of the UE will be defined as beam sweeping. In this case, SI to be estimated includes residual SI that reflects the analog SI cancellation capability limitations.

However, as mentioned above, the Tx beam and the Rx beam may be separately searched for, the SI for a beam in any directions possible for transmission of the eNB or a beam in any directions possible for reception of the UE may be estimated, the SINR and the MIMO rank of each of the UL and the DL may be estimated, and a beam corresponding to the greatest channel capacity may be selected.

Figure 2:
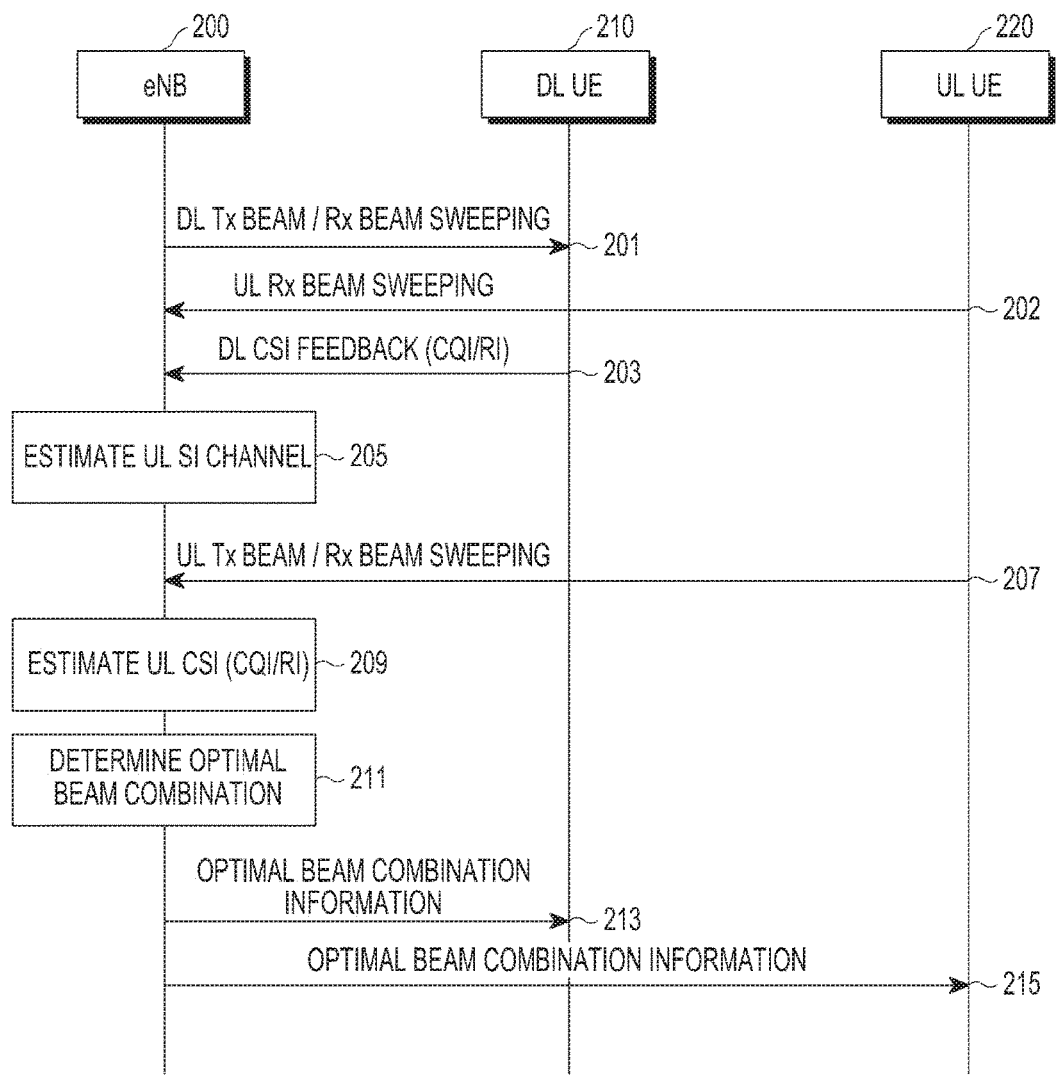
FIG. 2 is a signal flow diagram showing a procedure for determining an optimal beam for SI cancellation based on both a transmission (Tx) beam and a reception (Rx) beam when both an evolved NodeB (eNB) and a user equipment (UE) perform beamforming in a full-duplex communication system according to an embodiment of the present disclosure.

FIG. 2 is a signal flow diagram showing a procedure for determining an optimal beam for SI cancellation based on both a transmission (Tx) beam and a reception (Rx) beam when both an eNB and a UE perform beamforming in a full-duplex communication system according to an embodiment of the present disclosure.

Referring to FIG. 2, an illustrated communication system may include an eNB 200, a DL UE 210, and an UL UE 220.

The eNB 200 performs DL Tx beam/Rx beam sweeping with the DL UE 210 in operation 201. That is, the eNB 200 transmits a signal in transmittable beam directions once or more times to measure an SINR and an MIMO rank of the DL UE 210, and the DL UE 210 receives the signal in receivable beam directions.

The eNB 200 receives a signal transmitted by the UL UE 220 in receivable beam directions.

The DL UE 210 estimates channel state information (CSI) of the DL, e.g., a channel quality indicator (CQI) and a rank indicator (RI), and feeds the estimated CQI and RI back to the eNB 200 in operation 203.

The eNB 200 estimates an UL SI channel for beam combinations based on the CIS fed back from the DL UE 210 in operation 205. The beam combinations include a Tx beam/Rx beam combination of the eNB 200, a Tx beam/Rx beam combination in the UL, a Tx beam/Rx beam combination in the DL, etc., and the DL CSI includes a CQI, an RI, etc. Thereafter, the eNB 200 may obtain residual SI by reflecting the analog SI cancellation capability limitations to the SI channel estimated in operation 205.

The eNB 200 performs UL Tx beam/Rx beam sweeping with the UL UE 220 in operation 207. That is, the UL UE 220 transmits a signal in transmittable beam directions once or more times to allow the eNB 200 to measure an SINR and an MIMO rank of the UL, and the eNB 200 receives the signal in receivable beam directions and estimates the CSI of the UL, that is, the CQI and the RI in operation 209.

The eNB 200 determines an optimal beam combination for SI cancellation based on the DL CSI received in operation 203 and the UL CSI estimated in operation 209 in operation 211, and transmits information about the determined optimal beam combination to the DL UE 210 and the UL UE 220 in operations 213 and 215, respectively. A configuration for determining the optimal beam combination will be described in more detail with reference to FIG. 3.

Figure 3:
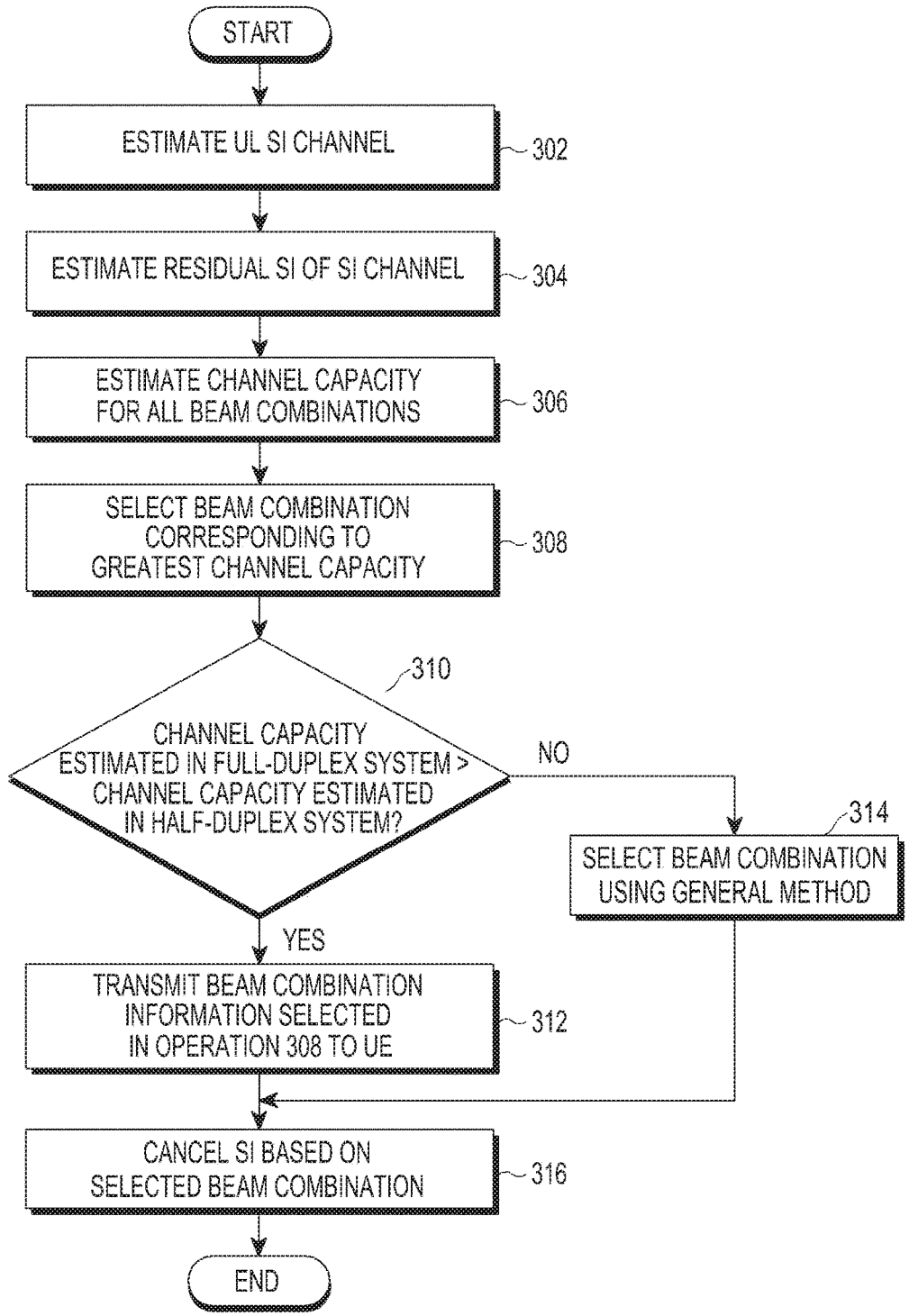
FIG. 3 is a flowchart showing a process of cancelling SI based on both a Tx beam and a Rx beam when both an eNB and a UE perform beamforming in a full-duplex communication system according to an embodiment of the present disclosure.

FIG. 3 is a flowchart showing a process of cancelling SI based on both a Tx beam and a Rx beam when both an eNB and a UE perform beamforming in a full-duplex communication system according to an embodiment of the present disclosure.

Referring to FIG. 3, the eNB estimates an UL SI channel for beam combinations by searching for a DL Tx beam and an UL Rx beam in operation 302.

In operation 304, the eNB estimates residual SI of an SI channel by reflecting analog SI cancellation capability limitations in the SI channel.

The eNB estimates a channel capacity for beam combinations in operation 306, and selects a beam combination having the greatest channel capacity as an optimal beam for SI cancellation in operation 308. The beam combinations may include a Tx beam/Rx beam combination of the eNB, a Tx beam/Rx beam combination of a DL, a Tx beam/Rx beam combination in an UL, and so forth.

In operation 310, the eNB determines whether a channel capacity of the selected beam combination, that is, a channel capacity estimated in the full-duplex communication system is greater than a sum of an UL channel capacity and a DL channel capacity, that is, a channel capacity estimated in the half-duplex communication system.

If determining that the channel capacity estimated in the full-duplex communication system is greater than the channel capacity estimated in the half-duplex communication system, the eNB proceeds to operation 312 to transmit information about the beam combination selected in operation 308.

If determining that the channel capacity estimated in the full-duplex communication system is less than or equal to the channel capacity estimated in the half-duplex communication system, the eNB proceeds to operation 314 to select an optimal beam for SI cancellation by using a general beam selection method.

In operation 316, the eNB cancels SI based on the selected beam combination.

Figure 4:
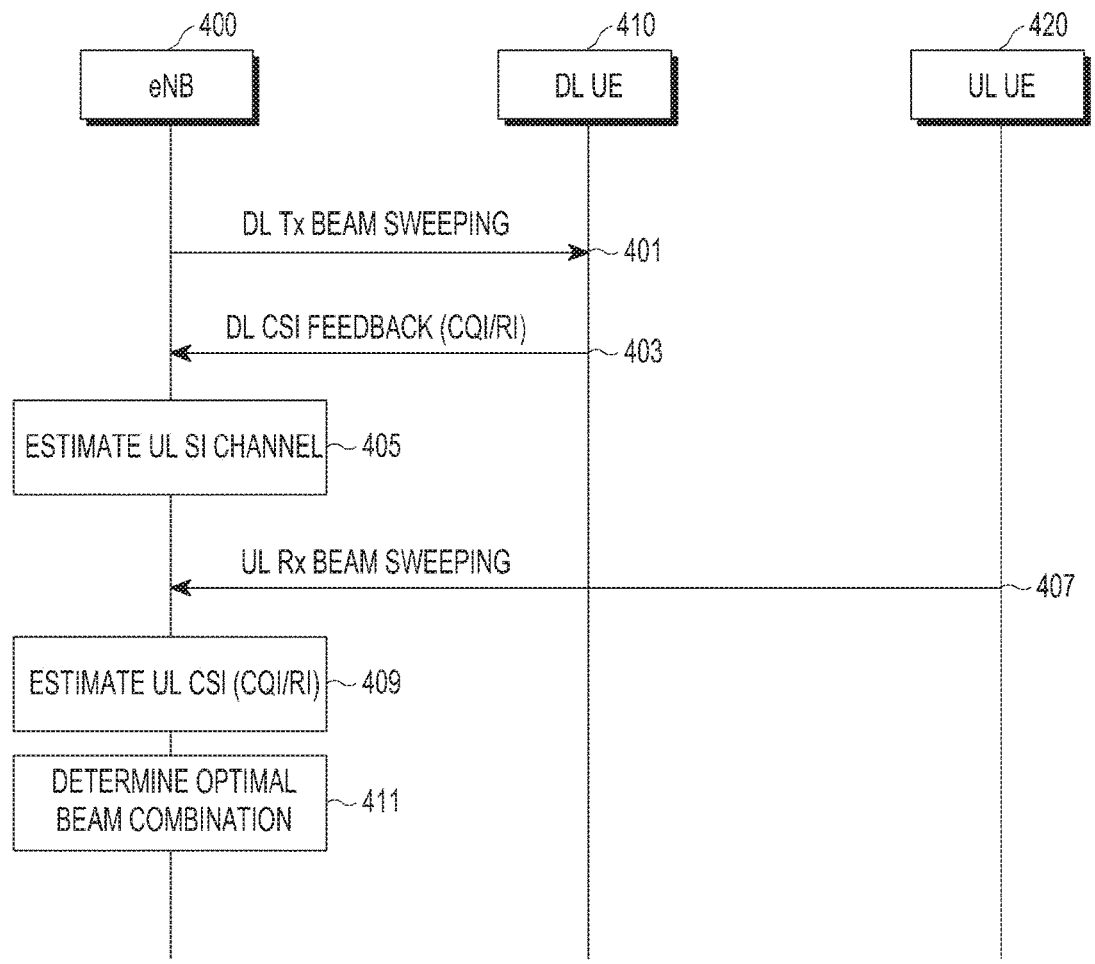
FIG. 4 is a signal flow diagram showing a procedure for determining an optimal beam for SI cancellation based on both a Tx beam and a Rx beam when an eNB performs beamforming in a full-duplex communication system according to an embodiment of the present disclosure.

FIG. 4 is a signal flow diagram showing a procedure for determining an optimal beam for SI cancellation based on both a Tx beam and a Rx beam when an eNB performs beamforming in a full-duplex communication system according to an embodiment of the present disclosure.

Referring to FIG. 4, an illustrated communication system may include an eNB 400, a DL UE 410, and an UL UE 420.

The eNB 400 performs DL Tx beam sweeping with the DL UE 410 in operation 401. That is, the eNB 400 transmits a signal in transmittable beam directions once or more times to measure an SINR and an MIMO rank of the DL UE 410, and the DL UE 410 receives the signal to estimate the CIS, e.g., the CQI and the RI, of the DL. The DL UE 410 feeds the estimated CQI and RI back to the eNB 400 in operation 403.

The eNB 400 estimates an UL SI channel for beam combinations based on the DL CSI fed back from the DL UE 410 in operation 405. The beam combinations may include a Tx beam/Rx beam combination of the eNB, a Tx beam/Rx beam combination of a DL, a Tx beam/Rx beam combination in an UL, and so forth, and the DL CSI may include the CQI and the RI. Thereafter, the eNB 400 may obtain residual SI by reflecting the analog SI cancellation capability limitations to the SI channel estimated in operation 405.

The eNB 400 performs UL Rx beam sweeping with the UL UE 420 in operation 407. That is, the eNB 400 receives a signal transmitted from the UL UE 220 in receivable beam directions and estimates the CIS, e.g., the CQI and the RI, of the UL.

The eNB 400 determines an optimal beam combination for SI cancellation based on the DL CSI received in operation 403 and the UL CSI estimated in operation 409 in operation 411. A configuration for determining the optimal beam combination will be described in more detail with reference to FIG. 5.

Figure 5:
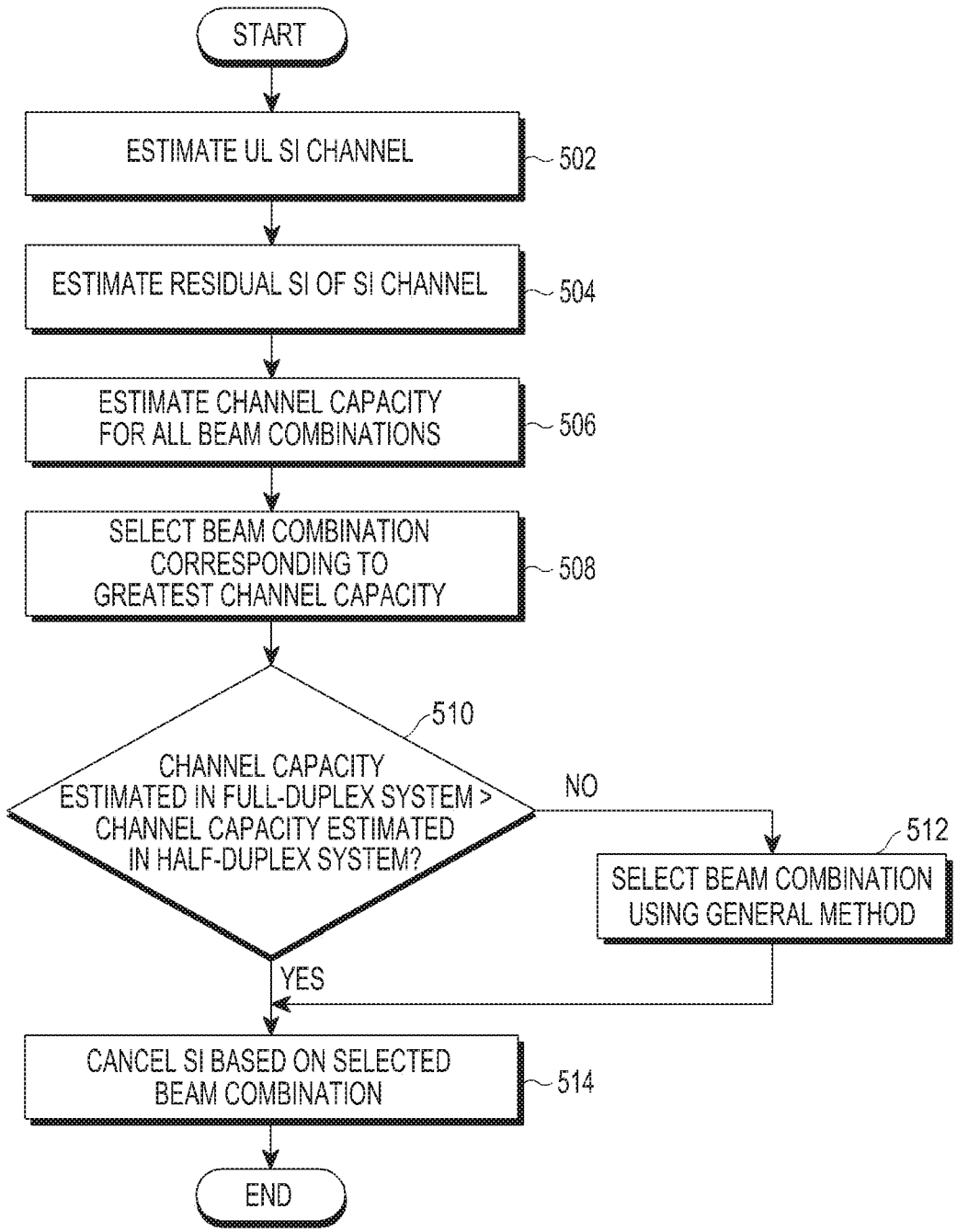
FIG. 5 is a flowchart showing a process of cancelling SI based on both a Tx beam and a Rx beam when an eNB performs beamforming in a full-duplex communication system according to an embodiment of the present disclosure.

FIG. 5 is a flowchart showing a process of cancelling SI based on both a Tx beam and a Rx beam when an eNB performs beamforming in a full-duplex communication system according to an embodiment of the present disclosure.

Referring to FIG. 5, the eNB estimates an UL SI channel for beam combinations by searching for a DL Tx beam and an UL Rx beam in operation 502.

In operation 504, the eNB estimates residual SI of an SI channel by reflecting analog SI cancellation capability limitations in the SI channel.

The eNB estimates a channel capacity for beam combinations in operation 506, and selects a beam combination having the greatest channel capacity as an optimal beam for SI cancellation in operation 508. The beam combinations may include a Tx beam/Rx beam combination of the eNB, a Tx beam/Rx beam combination of a DL, a Tx beam/Rx beam combination in an UL, and so forth.

In operation 510, the eNB determines whether a channel capacity of the selected beam combination, that is, a channel capacity estimated in the full-duplex communication system is greater than a sum of an UL channel capacity and a DL channel capacity, that is, a channel capacity estimated in the half-duplex communication system.

If determining that the channel capacity estimated in the full-duplex communication system is greater than the channel capacity estimated in the half-duplex communication system, the eNB proceeds to operation 514 to cancel SI based on the selected beam combination in operation 514.

If determining that the channel capacity estimated in the full-duplex communication system is less than or equal to the channel capacity estimated in the half-duplex communication system, the eNB proceeds to operation 512 to select a beam combination to be used for SI cancellation by using a general beam selection method.

Figure 6:
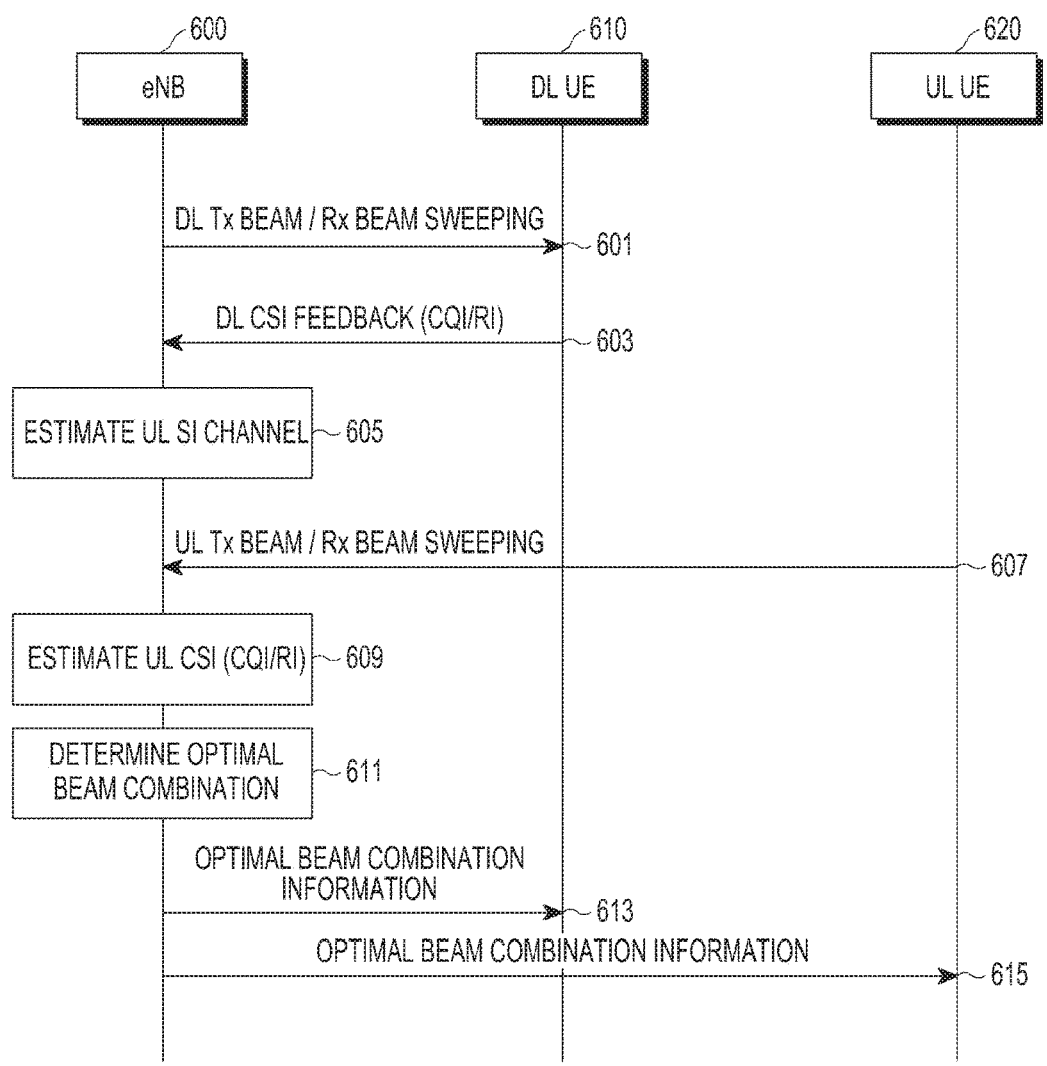
FIG. 6 is a signal flow diagram showing a procedure for determining an optimal beam for SI cancellation based on a Tx beam when both an eNB and a UE perform beamforming in a full-duplex communication system according to an embodiment of the present disclosure.

FIG. 6 is a signal flow diagram showing a procedure for determining an optimal beam for SI cancellation based on a Tx beam when both an eNB and a UE perform beamforming in a full-duplex communication system according to an embodiment of the present disclosure.

Referring to FIG. 6, an illustrated communication system may include an eNB 600, a DL UE 610, and an UL UE 620.

The eNB 600 performs DL Tx beam/Rx beam sweeping with the DL UE 610 in operation 601. That is, the eNB 600 transmits a signal in transmittable beam directions once or more times to measure an SINR and an MIMO rank of the DL UE 610, and the DL UE 610 receives the signal in receivable beam directions.

The DL UE 210 estimates the CSI, e.g., the CQI and the RI, of the DL, and feeds the estimated CQI and RI back to the eNB 600 in operation 603.

The eNB 600 estimates an UL SI channel for beam combinations based on the DL CSI fed back from the DL UE 610 in operation 605. The beam combinations may include a Tx beam/Rx beam combination of the eNB, a Tx beam/Rx beam combination of a DL, a Tx beam/Rx beam combination in an UL, and so forth, and the DL CSI may include the CQI and the RI. Thereafter, the eNB 600 may obtain residual SI by reflecting the analog SI cancellation capability limitations to the SI channel estimated in operation 605.

The eNB 600 performs UL Tx beam/Rx beam sweeping with the UL UE 620 in operation 607. That is, the UL UE 620 transmits a signal in transmittable beam directions once or more times to allow the eNB 600 to measure an SINR and an MIMO rank of the UL, and the eNB 600 receives the signal in receivable beam directions and estimates the CSI of the UL, that is, the CQI and the RI in operation 609.

The eNB 600 determines an optimal beam combination for SI cancellation based on the DL CSI received in operation 603 and the UL CSI estimated in operation 609 in operation 611, and transmits information about the determined optimal beam combination to the DL UE 610 and the UL UE 620 in operations 613 and 615, respectively. A configuration for determining the optimal beam combination will be described in more detail with reference to FIG. 7.

Figure 7:
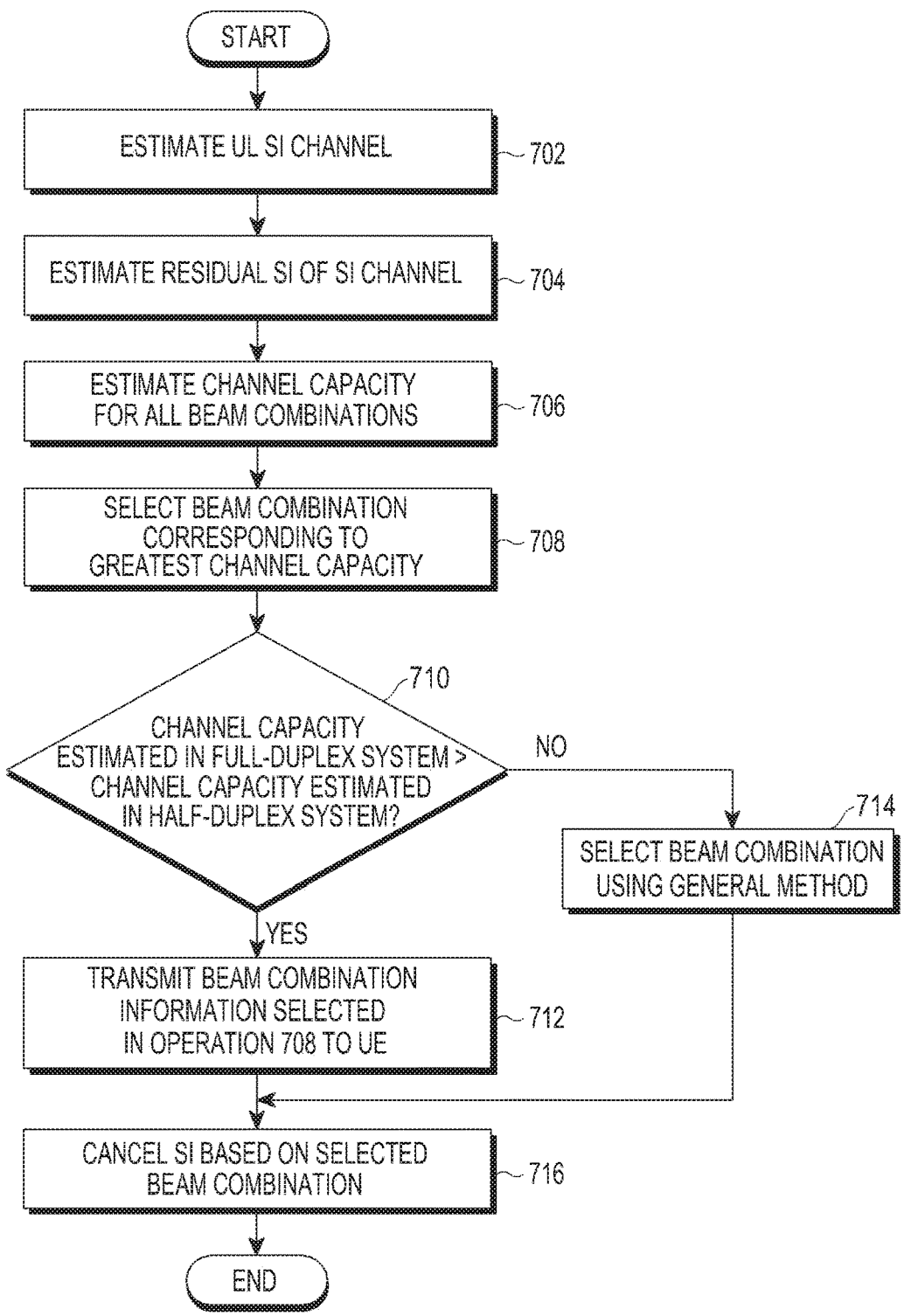
FIG. 7 is a flowchart showing a process of cancelling SI based on a Tx beam when both an eNB and a UE perform beamforming in a full-duplex communication system according to an embodiment of the present disclosure.

FIG. 7 is a flowchart showing a process of cancelling SI based on a Tx beam when both an eNB and a UE perform beamforming in a full-duplex communication system according to an embodiment of the present disclosure.

Referring to FIG. 7, the eNB estimates an UL SI channel for beam combinations by searching for a DL Tx beam in operation 702.

In operation 704, the eNB estimates residual SI of an SI channel by reflecting analog SI cancellation capability limitations in the SI channel.

The eNB estimates a channel capacity for beam combinations in operation 706, and selects a beam combination having the greatest channel capacity in operation 708. The beam combinations may include a Tx beam/Rx beam combination of the eNB, a Tx beam/Rx beam combination of a DL, a Tx beam/Rx beam combination in an UL, and so forth.

In operation 710, the eNB determines whether a channel capacity of the selected beam combination, that is, a channel capacity estimated in the full-duplex communication system is greater than a sum of an UL channel capacity and a DL channel capacity, that is, a channel capacity estimated in the half-duplex communication system.

If determining that the channel capacity estimated in the full-duplex communication system is greater than the channel capacity estimated in the half-duplex communication system, the eNB proceeds to operation 712 to transmit information about the beam combination selected in operation 708.

If determining that the channel capacity estimated in the full-duplex communication system is less than or equal to the channel capacity estimated in the half-duplex communication system, the eNB proceeds to operation 714 to select a beam combination to be used for SI cancellation by using a general beam selection method.

In operation 716, the eNB cancels SI based on the selected beam combination.

Figure 8:
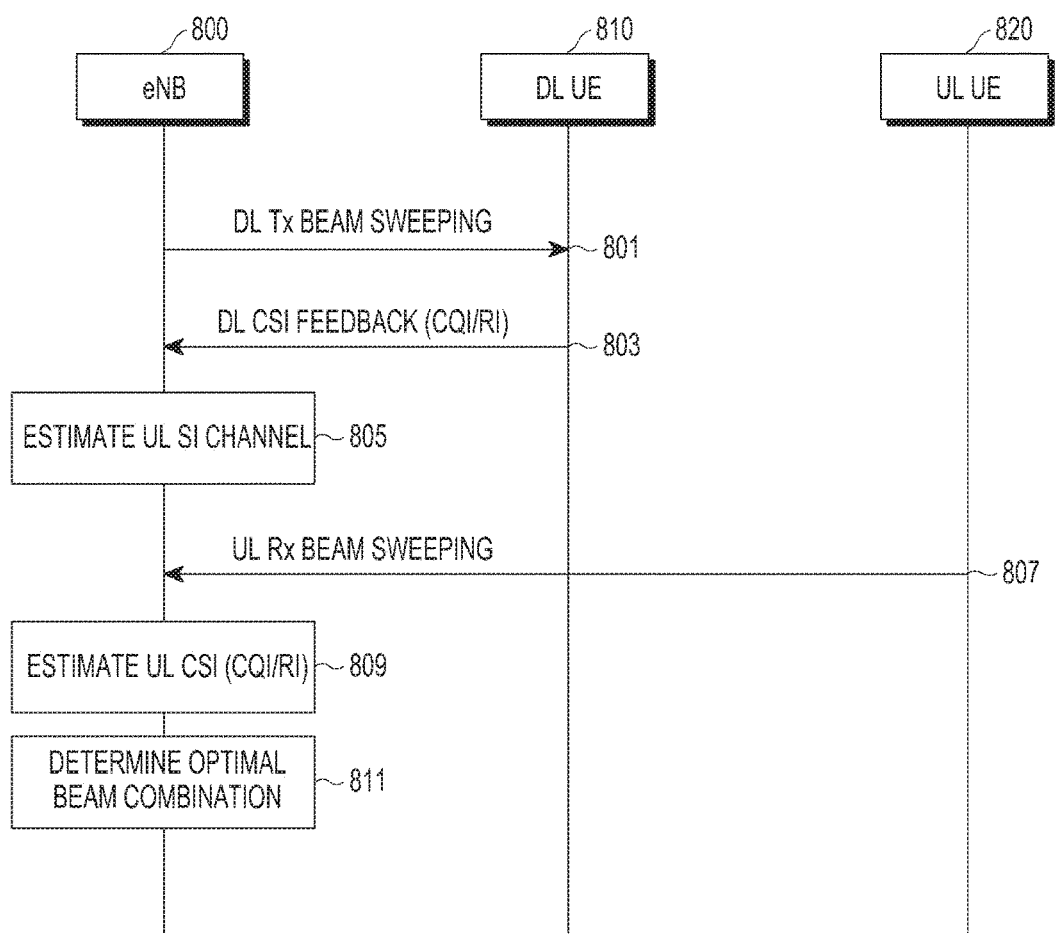
FIG. 8 is a signal flow diagram showing a procedure for determining an optimal beam for SI cancellation based on a Tx beam when an eNB performs beamforming in a full-duplex communication system according to an embodiment of the present disclosure.

FIG. 8 is a signal flow diagram showing a procedure for determining an optimal beam for SI cancellation based on a Tx beam when an eNB performs beamforming in a full-duplex communication system according to an embodiment of the present disclosure.

Referring to FIG. 8, an illustrated communication system may include an eNB 800, a DL UE 810, and an UL UE 820.

The eNB 800 performs DL Tx beam sweeping with the DL UE 810 in operation 801. That is, the eNB 800 transmits a signal in transmittable beam directions once or more times to measure an SINR and an MIMO rank of the DL UE 810, and the DL UE 810 receives the signal to estimate the CIS, e.g., the CQI and the RI, of the DL. The DL UE 810 feeds the estimated CQI and RI back to the eNB 800 in operation 803.

The eNB 800 estimates an UL SI channel for beam combinations based on the DL CSI fed back from the DL UE 810 in operation 805. The beam combinations may include a Tx beam/Rx beam combination of the eNB, a Tx beam/Rx beam combination of a DL, a Tx beam/Rx beam combination in an UL, and so forth, and the DL CSI may include the CQI and the RI. Thereafter, the eNB 800 may obtain residual SI by reflecting the analog SI cancellation capability limitations to the SI channel estimated in operation 805.

The eNB 800 performs UL Rx beam sweeping with the UL UE 820 in operation 807. That is, the eNB 800 receives a signal transmitted from the UL UE 820 in receivable beam directions and estimates the CIS, e.g., the CQI and the RI, of the UL, in operation 809.

The eNB 800 determines an optimal beam combination for SI cancellation based on the DL CSI received in operation 803 and the UL CSI estimated in operation 809 in operation 811. A configuration for determining the optimal beam combination will be described in more detail with reference to FIG. 9.

Figure 9:
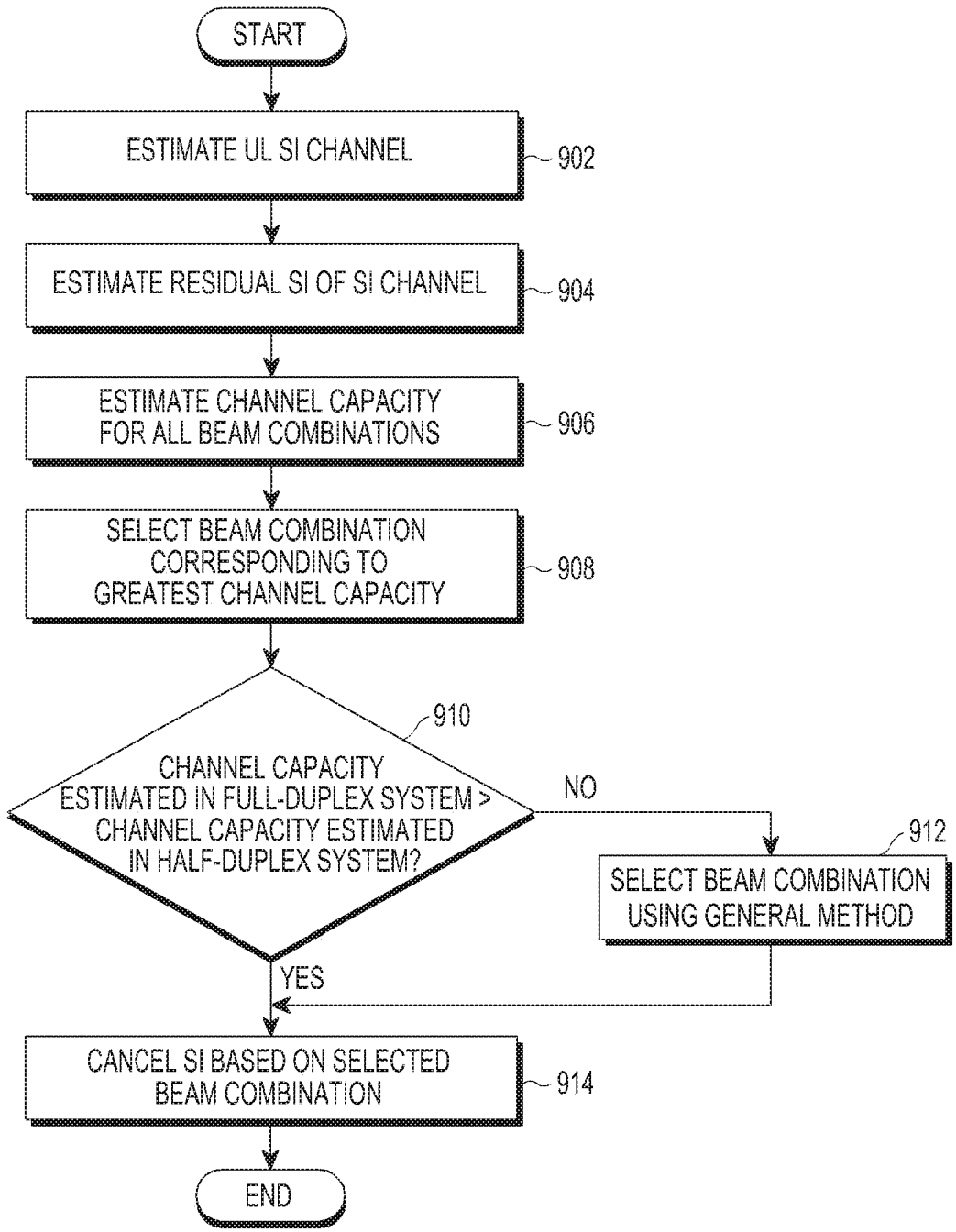
FIG. 9 is a flowchart showing a process of cancelling SI based on a Tx beam when an eNB performs beamforming in a full-duplex communication system according to an embodiment of the present disclosure.

FIG. 9 is a flowchart showing a process of cancelling SI based on a Tx beam when an eNB performs beamforming in a full-duplex communication system according to an embodiment of the present disclosure.

Referring to FIG. 9, the eNB estimates an UL SI channel for beam combinations by searching for a DL Tx beam in operation 902.

In operation 904, the eNB estimates residual SI of an SI channel by reflecting analog SI cancellation capability limitations in the SI channel.

The eNB estimates a channel capacity for beam combinations in operation 906, and selects a beam combination having the greatest channel capacity as an optimal beam for SI cancellation in operation 908. The beam combinations may include a Tx beam/Rx beam combination of the eNB, a Tx beam/Rx beam combination of a DL, a Tx beam/Rx beam combination in an UL, and so forth.

In operation 910, the eNB determines whether a channel capacity of the selected beam combination, that is, a channel capacity estimated in the full-duplex communication system is greater than a sum of an UL channel capacity and a DL channel capacity, that is, a channel capacity estimated in the half-duplex communication system.

If determining that the channel capacity estimated in the full-duplex communication system is greater than the channel capacity estimated in the half-duplex communication system, the eNB proceeds to operation 914 to cancel SI based on the selected beam combination in operation 514.

If determining that the channel capacity estimated in the full-duplex communication system is less than or equal to the channel capacity estimated in the half-duplex communication system, the eNB proceeds to operation 912 to select a beam combination to be used for SI cancellation by using a general beam selection method.

Figure 10:
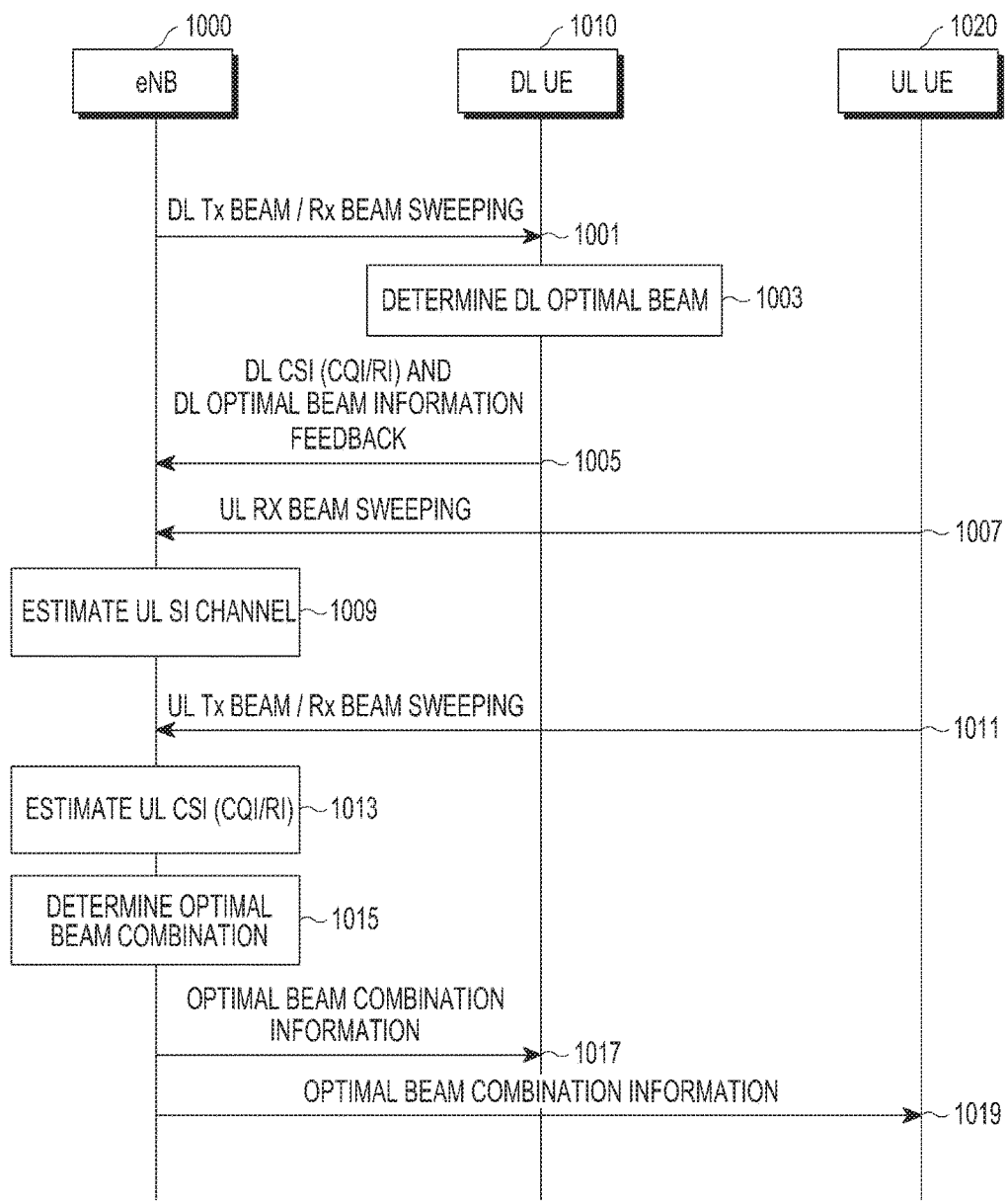
FIG. 10 is a signal flow diagram showing a procedure for determining an optimal beam for SI cancellation based on a Rx beam when both an eNB and a UE perform beamforming in a full-duplex communication system according to an embodiment of the present disclosure.

FIG. 10 is a signal flow diagram showing a procedure for determining an optimal beam for SI cancellation based on a Rx beam when both an eNB and a UE perform beamforming in a full-duplex communication system according to an embodiment of the present disclosure.

Referring to FIG. 10, an illustrated communication system may include an eNB 1000, a DL UE 1010, and an UL UE 1020.

The eNB 1000 performs DL Tx beam/Rx beam sweeping with the DL UE 1010 in operation 1001. That is, the eNB 1000 transmits a signal in transmittable beam directions once or more times to measure an SINR and an MIMO rank of the DL UE 1010, and the DL UE 1010 receives the signal in receivable beam directions.

The DL UE 1010 estimates the CSI, e.g., the CQI and the RI, of the DL, and feeds the estimated CQI and RI back to the eNB 1000 in operation 1005. In this case, the DL UE 1010 determines an Rx beam guaranteeing an optimal channel environment among Rx beams related to reception of a signal transmitted from the eNB 1000 as a DL optimal beam in operation 1003, and feeds information about the determined optimal beam together with the DL CSI in operation 1005.

The eNB 1000 performs UL Rx beam sweeping with the UL UE 1020 in operation 1007. The eNB 1000 receives a signal transmitted by the UL UE 1020 in receivable beam directions.

The eNB 1000 estimates an UL SI channel for beam combinations based on the DL CSI fed back from the DL UE 1010 and the information about the DL optimal beam in operation 1009. The beam combinations may include a Tx beam/Rx beam combination of the eNB, a Tx beam/Rx beam combination of a DL, a Tx beam/Rx beam combination in an UL, and so forth, and the DL CSI may include the CQI and the RI. Thereafter, the eNB 1000 may obtain residual SI by reflecting the analog SI cancellation capability limitations to the SI channel estimated in operation 1009.

The eNB 1000 performs UL Tx beam/Rx beam sweeping with the UL UE 1020 in operation 1011. That is, the UL UE 1020 transmits a signal in transmittable beam directions once or more times to allow the eNB 1000 to measure an SINR and an MIMO rank of the UL, and the eNB 1000 receives the signal in receivable beam directions and estimates the CSI of the UL, that is, the CQI and the RI in operation 1013.

The eNB 1000 determines an optimal beam combination for SI cancellation based on the DL CSI received in operation 1005 and the UL CSI estimated in operation 1013 in operation 1015, and transmits information about the determined optimal beam combination to the DL UE 1010 and the UL UE 1020 in operations 1017 and 1019, respectively. A configuration for determining the optimal beam combination will be described in more detail with reference to FIG. 11.

Figure 11:
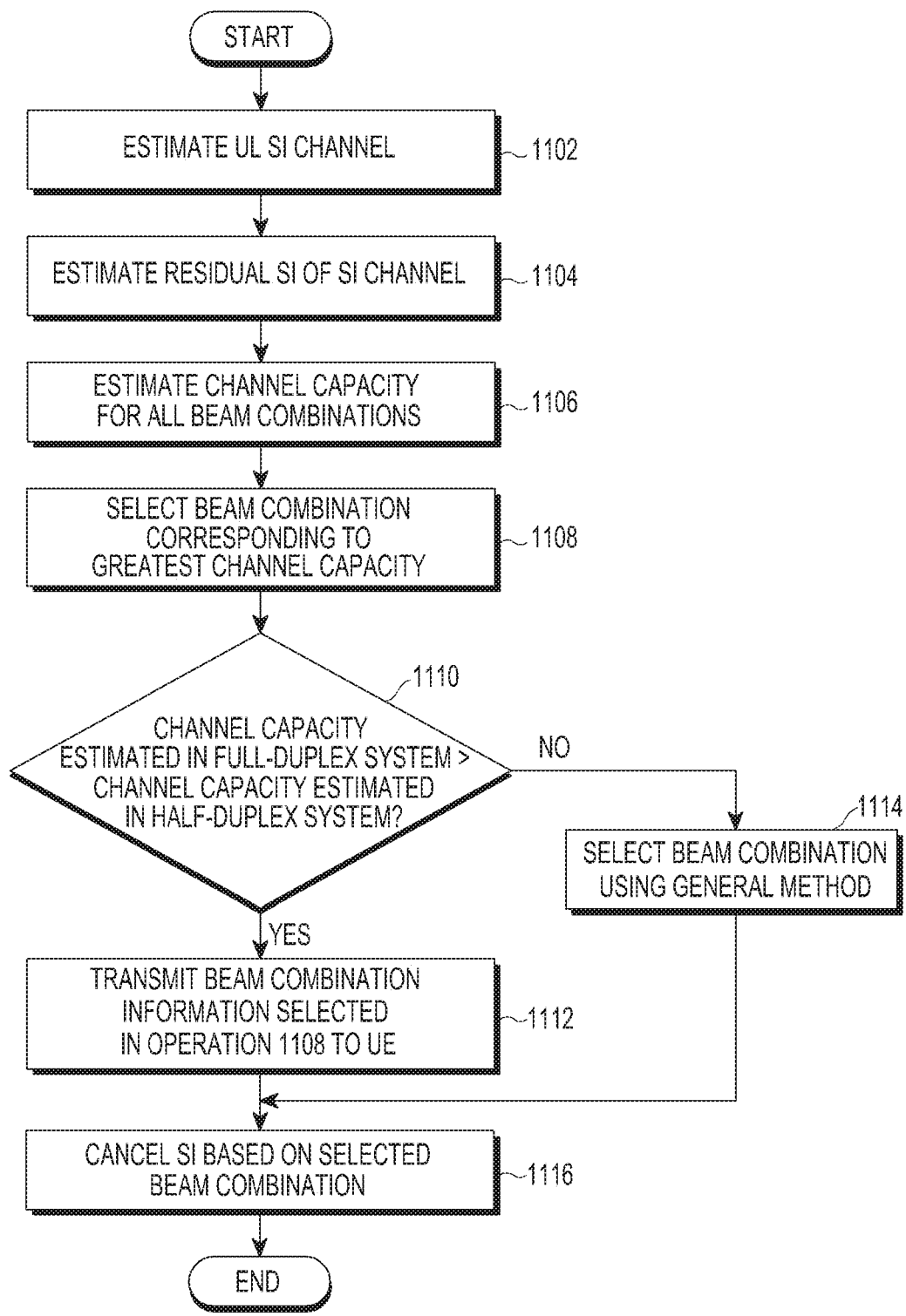
FIG. 11 is a flowchart showing a process of cancelling SI based on a Rx beam when both an eNB and a UE perform beamforming in a full-duplex communication system according to an embodiment of the present disclosure.

FIG. 11 is a flowchart showing a process of cancelling SI based on a Rx beam when both an eNB and a UE perform beamforming in a full-duplex communication system according to an embodiment of the present disclosure;

Referring to FIG. 11, the eNB estimates an UL SI channel for beam combinations by searching for a UL Rx beam in operation 1102.

In operation 1104, the eNB estimates residual SI of an SI channel by reflecting analog SI cancellation capability limitations in the SI channel.

The eNB estimates a channel capacity for beam combinations in operation 1106, and selects a beam combination having the greatest channel capacity as an optimal beam for SI cancellation in operation 1108. The beam combinations may include a Tx beam/Rx beam combination of the eNB, a Tx beam/Rx beam combination of a DL, a Tx beam/Rx beam combination in an UL, and so forth.

In operation 1110, the eNB determines whether a channel capacity of the selected beam combination, that is, a channel capacity estimated in the full-duplex communication system is greater than a sum of an UL channel capacity and a DL channel capacity, that is, a channel capacity estimated in the half-duplex communication system.

If determining that the channel capacity estimated in the full-duplex communication system is greater than the channel capacity estimated in the half-duplex communication system, the eNB proceeds to operation 1112 to transmit information about the beam combination selected in operation 1108.

If determining that the channel capacity estimated in the full-duplex communication system is less than or equal to the channel capacity estimated in the half-duplex communication system, the eNB proceeds to operation 1114 to select an optimal beam for SI cancellation by using a general beam selection method.

In operation 1116, the eNB cancels SI based on the selected beam combination.

Figure 12:
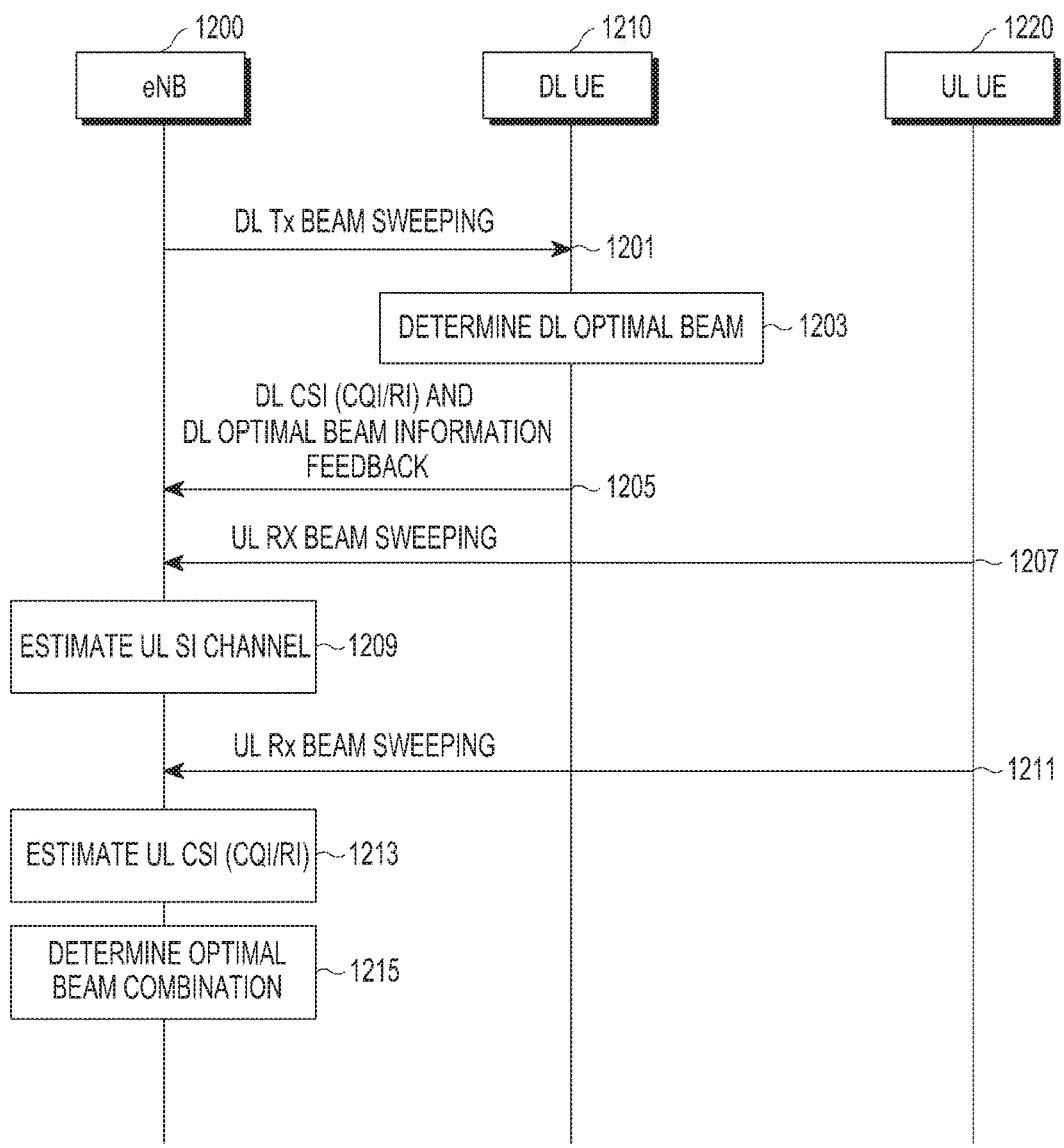
FIG. 12 is a signal flow diagram showing a procedure for determining an optimal beam for SI cancellation based on a Rx beam when an eNB performs beamforming in a full-duplex communication system according to an embodiment of the present disclosure.

FIG. 12 is a signal flow diagram showing a procedure for determining an optimal beam for SI cancellation based on a Rx beam when an eNB performs beamforming in a full-duplex communication system according to an embodiment of the present disclosure.

Referring to FIG. 12, an illustrated communication system may include an eNB 1200, a DL UE 1210, and an UL UE 1220.

The eNB 1200 performs DL Tx beam sweeping with the DL UE 1210 in operation 1201. That is, the eNB 1200 transmits a signal in transmittable beam directions once or more times to measure an SINR and an MIMO rank of the DL UE 1210, and the DL UE 1210 receives the signal to estimate the CIS, e.g., the CQI and the RI, of the DL. The DL UE 1210 feeds the estimated CQI and RI back to the eNB 1200 in operation 1205. In this case, the DL UE 1210 determines an Rx beam guaranteeing an optimal channel environment among Rx beams related to reception of a signal transmitted from the eNB 1100 as a DL optimal beam in operation 1203, and feeds information about the determined optimal beam together with the DL CSI in operation 1205.

The eNB 1200 performs UL Rx beam sweeping with the UL UE 1220 in operation 1207. The eNB 1200 receives a signal transmitted by the UL UE 1220 in receivable beam directions.

The eNB 1200 estimates an UL SI channel for beam combinations based on the DL CSI fed back from the DL UE 1210 and the information about the DL optimal beam in operation 1209. The beam combinations may include a Tx beam/Rx beam combination of the eNB, a Tx beam/Rx beam combination of a DL, a Tx beam/Rx beam combination in an UL, and so forth, and the DL CSI may include the CQI and the RI. Thereafter, the eNB 1200 may obtain residual SI by reflecting the analog SI cancellation capability limitations to the SI channel estimated in operation 1209.

The eNB 1200 performs UL Rx beam sweeping with the UL UE 1220 in operation 1211. That is, the eNB 1200 receives a signal transmitted from the UL UE 1220 in receivable beam directions and estimates the CIS, e.g., the CQI and the RI, of the UL, in operation 1213.

The eNB 1200 determines an optimal beam combination for SI cancellation based on the DL CSI received in operation 1205 and the UL CSI estimated in operation 1213 in operation 1215. A configuration for determining the optimal beam combination will be described in more detail with reference to FIG. 13.

Figure 13:
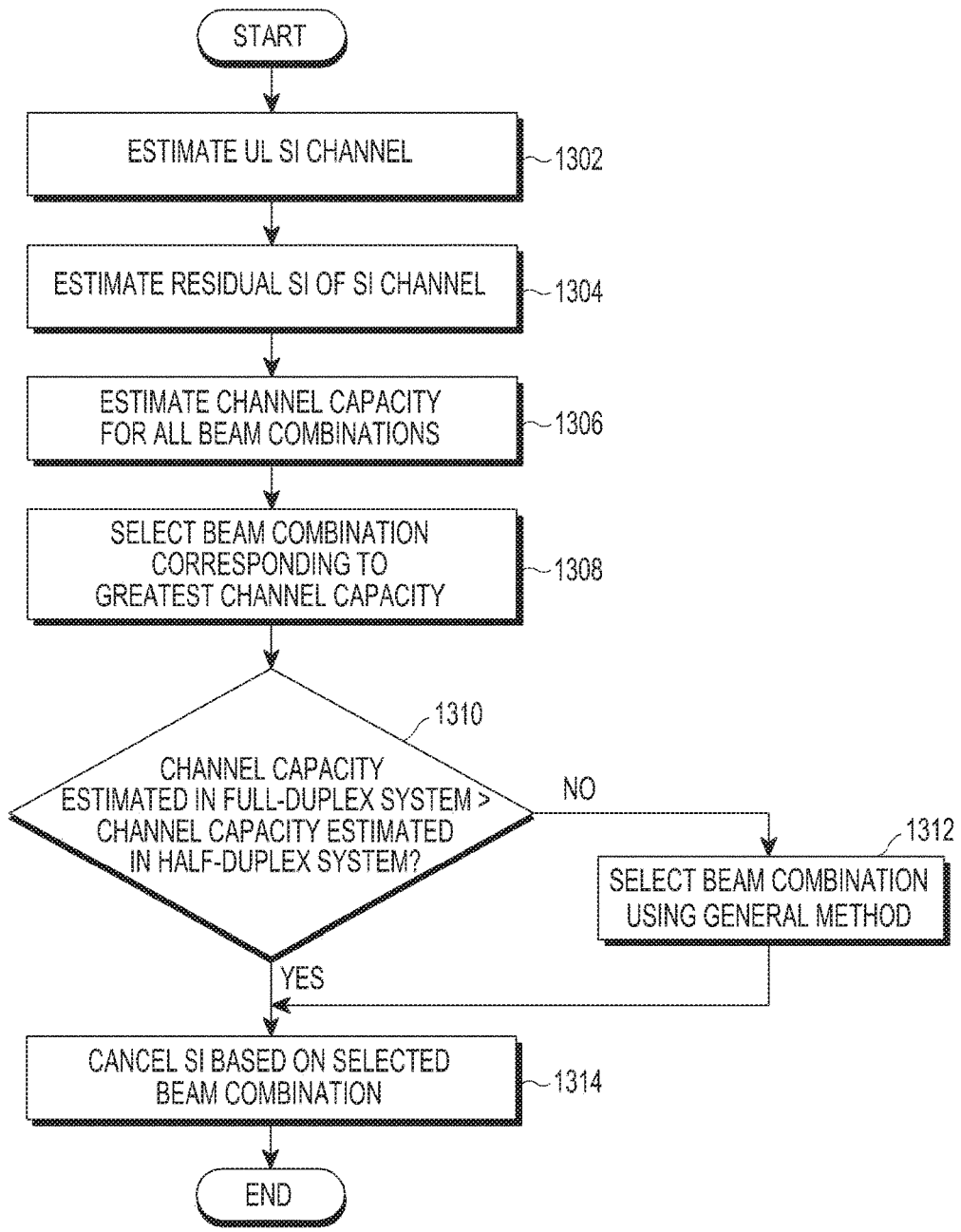
FIG. 13 is a flowchart showing a process of cancelling SI based on a Rx beam when an eNB performs beamforming in a full-duplex communication system according to an embodiment of the present disclosure.

FIG. 13 is a flowchart showing a process of cancelling SI based on a Rx beam when an eNB performs beamforming in a full-duplex communication system according to an embodiment of the present disclosure.

Referring to FIG. 13, the eNB estimates an UL SI channel for beam combinations by searching for a UL Rx beam in operation 1302.

In operation 1304, the eNB estimates residual SI of an SI channel by reflecting analog SI cancellation capability limitations in the SI channel.

The eNB estimates a channel capacity for beam combinations in operation 1306, and selects a beam combination having the greatest channel capacity as an optimal beam for SI cancellation in operation 1308. The beam combinations may include a Tx beam/Rx beam combination of the eNB, a Tx beam/Rx beam combination of a DL, a Tx beam/Rx beam combination in an UL, and so forth.

In operation 1310, the eNB determines whether a channel capacity of the selected beam combination, that is, a channel capacity estimated in the full-duplex communication system is greater than a sum of an UL channel capacity and a DL channel capacity, that is, a channel capacity estimated in the half-duplex communication system.

If determining that the channel capacity estimated in the full-duplex communication system is greater than the channel capacity estimated in the half-duplex communication system, the eNB proceeds to operation 1314 to cancel SI based on the selected beam combination in operation 514.

If determining that the channel capacity estimated in the full-duplex communication system is less than or equal to the channel capacity estimated in the half-duplex communication system, the eNB proceeds to operation 1312 to select a beam combination to be used for SI cancellation by using a general beam selection method.

Figure 14:
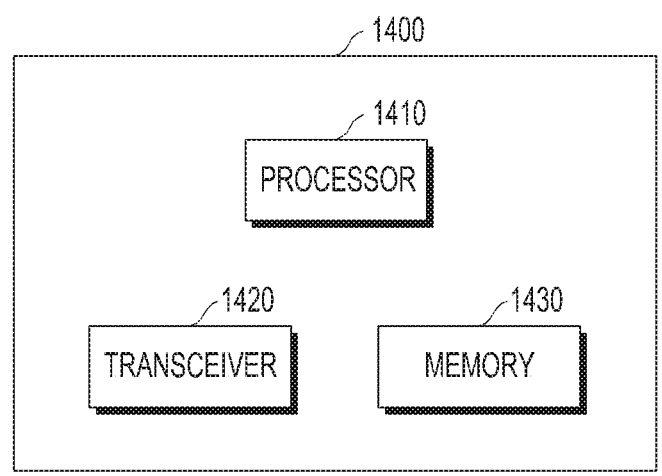
FIG. 14 is a block diagram of a communication apparatus according to an embodiment of the present disclosure.

FIG. 14 is a block diagram of a communication apparatus according to an embodiment of the present disclosure. A communication apparatus 1400 may communicate in the full-duplex communication system. The communication apparatus 1400 may be, but not limited to, an eNB capable of performing transmission and reception at the same time. For example, if a UE is capable of supporting transmission and reception at the same time in the full-duplex communication system, the communication apparatus 1400 may be the UE.

Referring to FIG. 14, the communication apparatus 1400 may include a processor 1410, a transceiver 1420, and a memory 1430.

The processor (or controller) 1410 may be connected to the transceiver 1420 and the memory 1430 in such a way to communicate with the transceiver 1420 and the memory 1430 and electrically. The processor 1410 performs the above-described methods and controls the transceiver 1420 and the memory 1430 to perform the above-described methods.

The communication apparatus 1400 may communicate with other entities through the transceiver 1420. The transceiver 1420 may communicate with other entities using full-duplex communication.

The memory 1430 stores information for operations of the communication apparatus 1400. For example, instructions or codes for controlling the processor 1410 to perform the above-described method for cancelling SI may be stored in the memory 1430. In addition, temporary, persistent, or semi-persistent data for performing the method for cancelling SI may be stored in the memory 1430.

Particular aspects of the present disclosure may be implemented with a computer-readable code on a computer-readable recording medium. The computer readable recording medium may be any type of data storage device that may store data readable by a computer system. Examples of record-mediums readable by the computer may include a read-only memory (ROM), a random-access memory (RAM), compact disk ROM (CD-ROM), magnetic tapes, floppy disks, optical data storage devices, carrier waves (such as data transmission through the Internet). The computer readable recording medium may be distributed through computer systems connected over a network, and thus the computer readable code is stored and executed in a decentralized manner. Further, functional programs, codes and code segments for achieving the present disclosure may be easily interpreted by programmers skilled in the art which the present disclosure pertains to.

The apparatus and method according to an embodiment of the present disclosure may be implemented by hardware, software, or a combination of hardware and software. Such arbitrary software may be stored, whether or not erasable or re-recordable, in a volatile or non-volatile storage such as a read-only memory (ROM), a memory such as a random-access memory (RAM), a memory chip, a device, or an integrated circuit; and an optically or magnetically recordable and machine (e.g., computer)-readable storage medium such as a compact disc (CD), a digital versatile disk (DVD), a magnetic disk, or a magnetic tape. It can be seen that the method according to the present disclosure may be implemented by a computer or a portable terminal which includes a controller and a memory, and the memory is an example of a machine-readable storage medium which is suitable for storing a program or programs including instructions for implementing the embodiment of the present disclosure.

Accordingly, the present invention includes a program that includes a code for implementing the apparatus and method set forth in the appended claims of the specification and a machine (computer, etc.) readable storage medium for storing the program. Furthermore, the program may be electronically transferred by an arbitrary medium, such as a communication signal transmitted through a wired or wireless connection, and the present invention appropriately includes equivalents of the program.

The apparatus according to an embodiment of the present disclosure may receive and store the program from a program providing device connected in a wired or wireless manner. The program providing device may include a memory for storing a program including instructions for instructing the apparatus to execute a preset method, information necessary for the method, a communication unit for performing wired or wireless communication with the apparatus, and a controller for transmitting a corresponding program to the apparatus at the request of the apparatus or automatically.

While embodiments of the present disclosure have been described, various changes may be made without departing the scope of the present disclosure. While the disclosure has been shown and described with reference to certain embodiments thereof, it will be understood by those skilled in the art that various changes in form and details may be made therein without departing from the spirit and scope of the disclosure as defined by the appended claims and their equivalents.

The invention claimed is:

1. A method for cancelling self-interference (SI) by a communication apparatus in a full-duplex communication system, the method comprising:
estimating a channel state of an uplink (UL) channel and a channel state of a downlink (DL) channel;
estimating a channel capacity for at least one beam combination based on the estimated channel state of the UL channel and the estimated channel state of the DL channel;
selecting a beam combination corresponding to a greatest channel capacity from among the at least one beam combination;
determining whether a channel capacity for the selected beam combination is greater than a channel capacity estimated in a half-duplex communication system; and
cancelling SI from a received signal based on the selected beam combination in response to determining that the channel capacity for the selected beam combination is greater than the channel capacity estimated in the half-duplex communication system.

2. The method of claim 1, wherein the estimating of the channel capacity comprises estimating the channel capacity for the at least one beam combination by applying a weight value based on a ratio of a traffic volume of the UL channel and a traffic volume of the DL channel.

3. The method of claim 1, wherein the estimating of the channel capacity comprises estimating a channel capacity for each of the at least one beam combination based on a channel state for each stream related to a multi input multi output (MIMO) rank of the UL channel or the DL channel, if the UL channel or the DL channel is a MIMO channel.

4. The method of claim 1, further comprising transmitting information related to the selected beam combination to a user equipment (UE).

5. The method of claim 1, wherein the at least one beam combination comprises at least one of a transmission (Tx) beam/reception (Rx) beam combination of the eNB, a Tx beam/Rx beam combination of a DL, or a Tx beam/Rx beam combination in an UL.

6. The method of claim 1, wherein the channel capacity estimated in the half-duplex communication system includes
a sum of a channel capacity of the UL channel and a channel capacity of the DL channel, which are estimated in the half-duplex communication system.

7. The method of claim 1, further comprising:
selecting a new beam combination if the channel capacity for the selected beam combination is less than or equal to the channel capacity estimated in the half-duplex communication system; and
cancelling SI from a received signal based on the selected new beam combination.

8. The method of claim 1, wherein the selecting of the beam combination corresponding to the greatest channel capacity comprises searching for both a Tx beam and an Rx beam or searching for one of the Tx beam and the Rx beam.

9. A communication apparatus which is communicable in a full-duplex communication system, the communication apparatus comprising:
a transceiver; and
at least one processor connected to the transceiver,
wherein the at least one processor is configured to:
estimate a channel state of an uplink (UL) channel and a channel state of a downlink (DL) channel,
estimate a channel capacity for at least one beam combination based on the estimated channel state of the UL channel and the estimated channel state of the DL channel,
select a beam combination corresponding to a greatest channel capacity from among the at least one beam combination,
determine whether a channel capacity for the selected beam combination is greater than a channel capacity estimated in a half-duplex communication system, and
cancel SI from a received signal based on the selected beam combination in response to determining that the channel capacity for the selected beam combination is greater than the channel capacity estimated in the half-duplex communication system.

10. The communication apparatus of claim 9, wherein the at least one processor is further configured to estimate the channel capacity for the at least one beam combination by applying a weight value based on a ratio of a traffic volume of the UL channel and a traffic volume of the DL channel.

11. The communication apparatus of claim 9, wherein the at least one processor is further configured to estimate a channel capacity for at least one beam combination based on a channel state for each stream related to a multi input multi output (MIMO) rank of the UL channel or the DL channel, if the UL channel or the DL channel is a MIMO channel.

12. The communication apparatus of claim 9, wherein the at least one beam combination comprise at least one of a transmission (Tx) beam/reception (Rx) beam combination of the eNB, a Tx beam/Rx beam combination of a DL, or a Tx beam/Rx beam combination in an UL.

13. The communication apparatus of claim 9, wherein the channel capacity estimated in the half-duplex communication system includes a sum of a channel capacity of the UL channel and a channel capacity of the DL channel, which are estimated in the half-duplex communication system.

14. The communication apparatus of claim 9, wherein the at least one processor is further configured to select a new beam combination if the channel capacity for the selected beam combination is less than or equal to the channel capacity estimated in the half-duplex communication system and to cancel SI from a received signal based on the selected new beam combination.

15. The communication apparatus of claim 9, wherein the at least one processor is further configured to select the beam combination corresponding to the greatest channel capacity by searching for both a Tx beam and an Rx beam or searching for one of the Tx beam and the Rx beam.

16. The communication apparatus of claim 9, wherein the at least one processor is further configured to control the transceiver to transmit information related to the selected beam combination to a user equipment (UE).

17. The communication apparatus of claim 9, wherein the channel state of the UL channel and the DL channel is estimated based on performing of a beam sweeping with a UE.

18. The communication apparatus of claim 9, wherein the at least one processor is further configured to estimate an UL SI channel for the beam combinations based on the channel state of the DL channel, and to obtain a residual SI component being cancelled an SI component cancellable by an analog interference cancellation circuit from the estimated UL SI.

19. The method of claim 1, wherein the channel state of the UL channel and the DL channel is estimated based on performing of a beam sweeping with a UE.

20. The method of claim 1, further comprising:
estimating an UL SI channel for the beam combinations based on the channel state of the DL channel; and
obtaining a residual SI component being cancelled an SI component cancellable by an analog interference cancellation circuit from the estimated UL SI.

* * * * *